(12) United States Patent
Gadde et al.

(10) Patent No.: US 12,175,782 B2
(45) Date of Patent: Dec. 24, 2024

(54) METHODS, SYSTEMS, ARTICLES OF MANUFACTURE AND APPARATUS TO LABEL TEXT ON IMAGES

(71) Applicant: Nielsen Consumer LLC, New York, NY (US)

(72) Inventors: Ravindra Gadde, New York, NY (US); Jose Javier Yebes Torres, Valladolid (ES); Dayron Rizo Rodriguez, New York, NY (US)

(73) Assignee: Nielsen Consumer LLC, Chicago, IL (US)

( * ) Notice: Subject to any disclaimer, the term of this patent is extended or adjusted under 35 U.S.C. 154(b) by 0 days.

(21) Appl. No.: 17/710,538

(22) Filed: Mar. 31, 2022

(65) Prior Publication Data

US 2023/0008198 A1     Jan. 12, 2023

Related U.S. Application Data

(60) Provisional application No. 63/220,789, filed on Jul. 12, 2021.

(51) Int. Cl.
*G06V 30/26* (2022.01)
*G06V 30/18* (2022.01)

(52) U.S. Cl.
CPC ........ *G06V 30/26* (2022.01); *G06V 30/18076* (2022.01)

(58) Field of Classification Search
CPC .......................... G06V 30/26; G06V 30/18076
See application file for complete search history.

(56) References Cited

U.S. PATENT DOCUMENTS

| 3,323,135 A | 6/1967 | Miller |
| 5,410,611 A | 4/1995 | Huttenlocher et al. |

(Continued)

FOREIGN PATENT DOCUMENTS

| CA | 2957433 C | 6/2020 |
| CN | 103123685 A | 5/2013 |

(Continued)

OTHER PUBLICATIONS

Bojanowski et al., "Enriching Word Vectors with Subword Information," In Journal Transactions of the Association for Computational Linwstics, 2017, vol. 5, pp. 135-146, 12 pages.

(Continued)

*Primary Examiner* — Gregory M Desire
(74) *Attorney, Agent, or Firm* — Hanley, Flight & Zimmerman, LLC

(57) ABSTRACT

Methods, systems, articles of manufacture and apparatus are disclosed to label text on images. An example apparatus includes colorizer circuitry to apply color to text boxes corresponding to optical character recognition (OCR) data associated with an image, OCR manager circuitry to render an OCR text prompt associated with the OCR data, the OCR text prompt to be rendered proximate to respective ones of the text boxes, the OCR text prompt to display a text portion of the OCR data, and edit circuitry to (a) render an interface in response to selection of the OCR text prompt, the interface populated with the text portion of the OCR data, and (b) in response to an overwrite input to the interface, update the text portion of the OCR data in a memory corresponding to the image.

20 Claims, 24 Drawing Sheets

(56) References Cited

U.S. PATENT DOCUMENTS

| | | | |
|---|---|---|---|
| 5,606,690 A | 2/1997 | Hunter | |
| 7,454,063 B1 | 11/2008 | Kneisl et al. | |
| 7,792,709 B1 | 9/2010 | Trandal | |
| 8,285,047 B2 * | 10/2012 | Nagarajan | G06V 30/1448 382/175 |
| 8,494,281 B2 * | 7/2013 | Nagarajan | G06F 16/313 358/403 |
| 8,787,695 B2 | 7/2014 | Wu | |
| 8,792,141 B2 * | 7/2014 | Moore | H04N 1/32144 715/224 |
| 8,983,170 B2 | 3/2015 | Nepomniachtchi | |
| 9,014,432 B2 | 4/2015 | Fan | |
| 9,158,744 B2 | 10/2015 | Rao et al. | |
| 9,239,952 B2 | 1/2016 | Hsu | |
| 9,262,686 B1 | 2/2016 | Singer | |
| 9,290,022 B2 | 3/2016 | Makabe | |
| 9,298,685 B2 * | 3/2016 | Barrus | G06F 40/174 |
| 9,298,979 B2 | 3/2016 | Nepomniachtchi | |
| 9,323,135 B1 | 4/2016 | Veloso | |
| 9,324,073 B2 | 4/2016 | Nepomniachtchi | |
| 9,384,389 B1 | 7/2016 | Sankaranarayanan | |
| 9,384,839 B2 | 7/2016 | Avila | |
| 9,396,540 B1 | 7/2016 | Sampson | |
| 9,684,842 B2 | 6/2017 | Deng | |
| 9,710,702 B2 | 7/2017 | Nepomniachtchi | |
| 9,747,504 B2 | 8/2017 | Ma | |
| 9,760,786 B2 | 9/2017 | Sahagun et al. | |
| 9,824,270 B1 | 11/2017 | Mao | |
| 9,875,385 B1 | 1/2018 | Humphreys | |
| 10,032,072 B1 | 7/2018 | Tran et al. | |
| 10,157,425 B2 | 12/2018 | Chelst | |
| 10,235,585 B2 | 3/2019 | Deng | |
| 10,242,285 B2 * | 3/2019 | Thrasher | G06V 10/457 |
| 10,395,772 B1 | 8/2019 | Lucas et al. | |
| 10,679,283 B1 | 6/2020 | Pesce | |
| 11,257,049 B1 | 2/2022 | Durazo Almeida | |
| 11,321,956 B1 | 5/2022 | Geng | |
| 11,410,446 B2 | 8/2022 | Shanmuganathan et al. | |
| 11,414,053 B2 * | 8/2022 | Tanaami | B60S 1/166 |
| 11,468,491 B2 | 10/2022 | Dalal | |
| 11,476,981 B2 * | 10/2022 | Wei | H04L 5/0053 |
| 11,562,557 B2 * | 1/2023 | Miginnis | G06V 10/60 |
| 11,587,148 B2 | 2/2023 | Elder | |
| 11,593,552 B2 * | 2/2023 | Sarkar | G06V 20/70 |
| 11,609,956 B2 * | 3/2023 | Jain | G06Q 50/01 |
| 11,625,930 B2 | 4/2023 | Rodriguez et al. | |
| 11,810,383 B2 * | 11/2023 | Patel | G06V 30/416 |
| 11,842,035 B2 * | 12/2023 | Jahjah | G06N 20/00 |
| 2002/0037097 A1 | 3/2002 | Hoyos | |
| 2003/0185448 A1 | 10/2003 | Seeger et al. | |
| 2006/0232619 A1 | 10/2006 | Otsuka | |
| 2007/0041642 A1 | 2/2007 | Romanoff et al. | |
| 2008/0205759 A1 | 8/2008 | Zandifar et al. | |
| 2009/0164422 A1 | 6/2009 | Pacella | |
| 2010/0306080 A1 | 12/2010 | Trandal | |
| 2011/0122443 A1 | 5/2011 | Otsuka | |
| 2011/0243445 A1 | 10/2011 | Uzelac et al. | |
| 2011/0289395 A1 | 11/2011 | Breuel et al. | |
| 2011/0311145 A1 | 12/2011 | Bern | |
| 2012/0183211 A1 | 7/2012 | Hsu | |
| 2012/0274953 A1 | 11/2012 | Makabe | |
| 2012/0330971 A1 | 12/2012 | Thomas | |
| 2013/0058575 A1 | 3/2013 | Koo et al. | |
| 2013/0170741 A9 | 7/2013 | Hsu et al. | |
| 2014/0002868 A1 | 1/2014 | Landa et al. | |
| 2014/0064618 A1 | 3/2014 | Janssen, Jr. | |
| 2014/0188647 A1 | 7/2014 | Argue | |
| 2014/0195891 A1 | 7/2014 | Venkata Radha Krishna Rao | |
| 2015/0039479 A1 | 2/2015 | Gotanda | |
| 2015/0127428 A1 | 5/2015 | Gharachorloo | |
| 2015/0169951 A1 | 6/2015 | Khintsitskiy | |
| 2015/0254778 A1 | 9/2015 | Kmak et al. | |
| 2015/0317642 A1 | 11/2015 | Argue | |
| 2015/0363792 A1 | 12/2015 | Arini | |
| 2015/0363822 A1 | 12/2015 | Rowe | |
| 2016/0005189 A1 | 1/2016 | Gray | |
| 2016/0034863 A1 | 2/2016 | Ross | |
| 2016/0063469 A1 | 3/2016 | Etzion | |
| 2016/0125383 A1 | 5/2016 | Chan | |
| 2016/0171585 A1 | 6/2016 | Singh | |
| 2016/0203625 A1 | 7/2016 | Khan et al. | |
| 2016/0210507 A1 | 7/2016 | Abdollahian | |
| 2016/0234431 A1 | 8/2016 | Kraft et al. | |
| 2016/0307059 A1 | 10/2016 | Chaudhury et al. | |
| 2016/0342863 A1 | 11/2016 | Kwon | |
| 2017/0293819 A1 | 10/2017 | Deng | |
| 2018/0005345 A1 | 1/2018 | Apodaca et al. | |
| 2018/0053045 A1 | 2/2018 | Lorenzini | |
| 2018/0060302 A1 | 3/2018 | Liang | |
| 2018/0317116 A1 | 11/2018 | Komissarov | |
| 2019/0026803 A1 | 1/2019 | De Guzman | |
| 2019/0050639 A1 | 2/2019 | Ast | |
| 2019/0080207 A1 | 3/2019 | Chang et al. | |
| 2019/0171900 A1 | 6/2019 | Thrasher | |
| 2019/0244020 A1 | 8/2019 | Yoshino | |
| 2019/0325211 A1 | 10/2019 | Ordonez et al. | |
| 2019/0332662 A1 | 10/2019 | Middendorf | |
| 2019/0354818 A1 | 11/2019 | Reisswig | |
| 2020/0097718 A1 | 3/2020 | Schäfer | |
| 2020/0142856 A1 | 5/2020 | Neelamana | |
| 2020/0151444 A1 | 5/2020 | Price | |
| 2020/0151902 A1 | 5/2020 | Almazán et al. | |
| 2020/0175267 A1 | 6/2020 | Schäfer | |
| 2020/0249803 A1 | 8/2020 | Sobel et al. | |
| 2020/0364451 A1 | 11/2020 | Ammar et al. | |
| 2020/0401798 A1 | 12/2020 | Foncubierta Rodriguez et al. | |
| 2020/0410231 A1 | 12/2020 | Chua | |
| 2021/0004880 A1 | 1/2021 | Benkreira et al. | |
| 2021/0019287 A1 | 1/2021 | Prasad et al. | |
| 2021/0034856 A1 | 2/2021 | Torres et al. | |
| 2021/0090694 A1 | 3/2021 | Colley et al. | |
| 2021/0117665 A1 | 4/2021 | Simantov | |
| 2021/0117668 A1 | 4/2021 | Zhong et al. | |
| 2021/0142092 A1 | 5/2021 | Zhao | |
| 2021/0149926 A1 | 5/2021 | Komninos et al. | |
| 2021/0158038 A1 | 5/2021 | Shanmuganathan et al. | |
| 2021/0216765 A1 | 7/2021 | Xu | |
| 2021/0248420 A1 | 8/2021 | Zhong et al. | |
| 2021/0295101 A1 | 9/2021 | Tang et al. | |
| 2021/0319217 A1 | 10/2021 | Wang et al. | |
| 2021/0334737 A1 | 10/2021 | Balaji | |
| 2021/0343030 A1 | 11/2021 | Sagonas et al. | |
| 2021/0357710 A1 | 11/2021 | Zhang | |
| 2021/0406533 A1 | 12/2021 | Arroyo | |
| 2022/0004756 A1 | 1/2022 | Jennings | |
| 2022/0114821 A1 | 4/2022 | Arroyo et al. | |
| 2022/0189190 A1 | 6/2022 | Arroyo et al. | |
| 2022/0198185 A1 | 6/2022 | Prebble | |
| 2022/0383651 A1 | 12/2022 | Shanmuganathan | |
| 2022/0397809 A1 | 12/2022 | Talpade et al. | |
| 2022/0414630 A1 | 12/2022 | Yebes Torres et al. | |
| 2023/0004748 A1 | 1/2023 | Rodriguez et al. | |
| 2023/0005286 A1 | 1/2023 | Yebes Torres et al. | |
| 2023/0008198 A1 | 1/2023 | Gadde et al. | |
| 2023/0196806 A1 | 6/2023 | Ramalingam et al. | |
| 2023/0214899 A1 | 7/2023 | Martínez Cebrián et al. | |
| 2023/0230408 A1 | 7/2023 | Arroyo et al. | |
| 2023/0394859 A1 | 12/2023 | Montero et al. | |

FOREIGN PATENT DOCUMENTS

| | | |
|---|---|---|
| CN | 104866849 A | 8/2015 |
| CN | 108229397 A | 6/2018 |
| CN | 108229397 A | 11/2018 |
| CN | 109389124 A | 2/2019 |
| CN | 108229397 B | 8/2020 |
| CN | 112446351 A | 3/2021 |
| CN | 112560862 A | 3/2021 |
| DE | 202013005144 U1 | 10/2013 |
| GB | 2595412 A | 11/2021 |
| JP | H0749529 A | 2/1995 |
| JP | H0749529 B2 | 2/1995 |
| JP | 2008021850 A | 1/2008 |
| JP | 2008210850 A | 9/2008 |

(56) References Cited

FOREIGN PATENT DOCUMENTS

| | | |
|---|---|---|
| JP | 2008211850 A | 9/2008 |
| JP | 2019139737 A | 8/2019 |
| JP | 7049529 B2 | 4/2022 |
| KR | 101831204 B1 | 2/2018 |
| WO | 2013044145 A1 | 3/2013 |
| WO | 2018054326 A1 | 3/2018 |
| WO | 2018201423 A1 | 11/2018 |
| WO | 2020194004 A1 | 10/2020 |
| WO | 2022006295 A1 | 1/2022 |
| WO | 2022123199 A1 | 6/2022 |

OTHER PUBLICATIONS

Vogel et al., "Parallel Implementations of Word Alignment Tool," Software Engineering, Testing, and Quality Assurance for Natural Language Processing, nn. 49-57, Jun. 2008, 10 pages.

Joulin et al., "Bag of Tricks for Efficient Text Classification," In Proceedings of the 15th Conference of the European Chapter of the Association for Computational Linguistics, Aug. 9, 2016, 5 pages.

Follmann et al., "MVTec D2S: Densely Segmented Supermarket Dataset". In European Conference on Computer Vision (ECCV), 2018, 17 pages.

Konda et al., "Magellan: Toward Building Entity Matching Management Systems Over Data Science Stacks," Proceedings of the VLDB Endowment, vol. 9, No. 13, pp. 1581-1584, 2016, 4 pages.

Genereux et al., "NLP Challenges in Dealing with OCR-ed Documents of Derogated Quality," Workshop on Replicability and Reproducibility in Natural Language Processing: adaptive methods,resources and software at IJCAI 2015, Jul. 2015, 6 pages.

Osindero et al., "Recursive Recurrent Nets with Attention Modeling for OCR in the Wild," in Conference on Computer Vision and Pattern Recollection (CVPR), 2016, 10 pages.

Nshuti, "Mobile Scanner and OCR (A First Step Towards Receipt to Spreadsheet)," 2015, 3 pages.

Wick et al., "Calamari—A High-Performance Tensorflow-based Deep Learning Package for Optical Character Recognition," Digital Humanities Quarterly, 2020, 12 pages. [retrieved from:https:/ /arxiv.org/ftp/arxiv/papers/1807/1807.02004.pdf].

Github, "Tesseract OCR" Tesseract Repository on GitHub, 2020, 3 pages. [available online, https://github. com/tesseract-ocr/].

Smith et al., "Identification of Common Molecular Subsequences," Journal of Molecular Biology, Academic Press Inc. (London) Ltd., pp. 195-197, 1981, 4 pages.

Vaswani et al., "Attention is all you need," In Advances in Neural Information Processing Systems, 31st Conference on Neural Information Processing Systems (NIPS 2017), Long Beach, CA, last revised Dec. 6, 2017, 15 pages.

Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.

Govindan et al., "Character Recognition—A Review," Pattern Recognition, vol. 23, No. 7, pp. 671-683, Jul. 20, 1990, 13 pages.

Lowe, "Distinctive Image Features from Scale-Invariant Key points," International Journal of Computer Vision (HCV), Jan. 5, 2004, 28 pages.

Marinai, "Introduction to Document Analysis and Recognition," Machine Learning in Document Analysis and Recognition, 2008, 22 pages.

O'Gorman et al., "Document Image Analysis," IEEE Computer Society Executive Briefings, 2009, 125 pages.

Krizhevsky et al., "ImageNet Classification with Deep Convolutional Neural Networks," In International Conference on Neural Information Processing Systems (NIPS), 2012, 9 pages.

Ronneberger et al., "U-Net: Convolutional Networks for Biomedical Image Segmentation," Medical Image Computing and Computer-Assisted Intervention (MICCAI), May 18, 2015, 8 pages.

Lecun et al., "Deep Learning," Nature, vol. 521, pp. 436-444, May 28, 2015, 9 pages.

Kim et al., "Character-Aware Neural Language Models," Proceedings of the Thirtieth AAAI Conference on Artificial Intelligence (AAAI'IO), pp. 2741-2749, 2016, 9 pages.

Ren et al., "Faster R-CNN: Towards Real-Time Object Detection with Region Proposal Networks," In International Conference on Neural Information Processing Systems (NIPS), pp. 91-99, Jan. 6, 2016, 14 pages.

Redmon et al., "You Only Look Once: Unified, Real-Time Object Detection," In Conference on Computer Vision and Pattern Recognition (CVPR), May 9, 2016, 10 pages.

Ozhiganov et al., "Deep Dive Into OCR for Receipt Recognition," DZone, Jun. 21, 2017, 18 pages.

Bartz et at, "STN-OCT: A Single Neural Network for Text Detection and Text Recognition, "Computer Vision and Pattern Recognition, Jul. 27, 2017, 9 pages.

Mudgal et al., "Deep Learning for Entity Matching: A Design Space Exploration," InProceedings of the 2018 International Conference on Management of Data, 2018, Houston, TX, 16 pages.

Ray et al., "U-PC: Unsupervised Planogram Compliance," in European Conference on Computer Vision (ECCV), 2018, 15 pages. [retrieved from:http://openaccess.thecvf.com/content_ECCV_2018/papers/ Archan_Ray_ U-PC_Unsupervised Planogram ECCV 2018 paper.pdf].

Hui, "mAP (mean Average Precision) for Object Detection," Mar. 6, 2018. Retrieved from [https://medium.com/@jonathan hui/map-mean-average-precision-for-object-detection-45c121a31173] on May 11, 2020, 2 pages.

Akbik et al., "Contextual String Embeddings for Sequence Labeling," In Proceedings of the 27th International Conference on Computational Linguistics (COLING), Aug. 2018, 12 pages.

Li et al., "Extracting Figures and Captions from Scientific Publications," Short Paper, CIKM18, Oct. 22-26, 2018, Torino, Italy, 4 pages.

Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.

Wikipedia, "Precision & Recall," Dec. 17, 2018 revision, 12 pages.

Artificial Intelligence & Image Analysis, "Intelligent Automation Eliminates Manual Data Entry From Complex Documents," White Paper, accessed on Jan. 30, 2019, 3 pages.

Artificial Intelligence & Image Analysis, "Historic Document Conversion," Industry Paper, accessed on Jan. 30, 2019, 4 pages.

Devlin et al., "BERT: Pre-training of Deep Bidirectional Transformers for Language Understanding," In Conference of the North American Chapter of the Association for ComputationalLinguistics (NAACL-HLT), Jun. 24, 2019, 16 pages.

Qasim et al., "Rethinking Table Recognition using Graph Neural Networks," In Inernational Conference on Document Analysis and Recognition (ICDAR), Jul. 3, 2019, 6 pages.

Feng et al., "Computer vision algorithms and hardware implementations: A survey", Integration: the VLSI Journal, vol. 69, pp. 309-320, https://www.sciencedirect.com/science/article/pii/S0167926019301762, accepted Jul. 27, 2019, 12 pages.

Oliveira et al., "dhSegment: A generic deep-learning approach for document segmentation," In 16th International Conference on Frontiers in Handwriting Recognition (ICFHR), Aug. 14, 2019, 6 pages.

Zhong et al., "PubLayNet: largest dataset ever for document layout analysis," In International Conference on Document Analysis and Recognition (ICDAR), Aug. 16, 2019, 8 pages.

International Searching Authority, "International Search Report and Written Opinion," issued in connection with PCT application No. PCT/IB2019/000299 dated Dec. 23, 2019, 9 pages.

Zacharias et al., "Image Processing Based Scene-Text Detection and Recognition with Tesseract," arXiv (CoRR), Apr. 17, 2020, 6 pages. [retrieved from: https://arxiv.org/pdf/2004.08079.pdf].

Xu et al., "LayoutLM: Pre-training of Text and Layout for Document Image Understanding," in International Conference on Knowledge Discovery & Data Mining (SIGKDD), Jun. 16, 2020, 9 pages. [retrieved from: https://arxiv.org/pdf/1912.13318.pdf].

Yu et al., "PICK: Processing Key Information Extraction from Documents using Improved Graph Learning-Convolutional Net-

(56) References Cited

OTHER PUBLICATIONS works," in International Conference on Pattern Recognition (ICPR), Jul. 18, 2020, 8 pages. [retrieved from: https://arxiv.org/pdf/2004.07464.pdf].
Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.
DeepDive, "Distant Supervision" 2021, 2 pages. [available online on Stanford University website, http://deepdive.stanford.cdu/distant_supervision].
International Searching Authority, "International Search Report," mailed in connection with International Patent Application No. PCT/US2020/061269, on Mar. 11, 2021, 3 pages.
International Searching Authority, "Written Opinion of the International Searching Authority", issued in connection with International Patent Application No. PCT/US2020/061269, dated Mar. 11, 2021, 4 Pages.
United States Patent and Trademark Office, "Non-Final Office Action," issued in connection with U.S. Appl. No. 16/692,797, dated Mar. 16, 2021, 12 pages.
Google, "Detect Text in Images," Mar. 29, 2021, 16 pages. Retrieved from http://cloud.google.com/vision/docs/ocr.
Intellectual Property Office of United Kingdom, "Intention to Grant under Section 18(4)," issued in connection with British Patent Application GB2112299.9, mailed on Jul. 13, 2023, 2 Pages.
United States Patent and Trademark Office, "Corrected Notice of Allowability," issued in connection with U.S. Appl. No. 17/345,940, dated Jul. 20, 2023, 3 pages.
International Searching Authority, "International Search Report and Written Opinion," issued in connection with International Patent Appl. No. PCT/US2023/011859, dated Aug. 3, 2023, 7 pages.
Poulovassilis et al. "A nested-graph model for the representation and manipulation of complex objects." ACM Trans. Inf. Syst. 12 (1994): 34 pages.
Ng et al. "On Spectral Clustering: Analysis and an algorithm." NIPS (2001), 8 pages.
Chung et al. "Empirical Evaluation of Gated Recurrent Neural Networks on Sequence Modeling." ArXivabs/1412.3555 (2014): 9. pag.
Amazon, "Intelligent Document Processing," Amazon Web Services, https://aws.amazon.com/machine-learning/ml-use-cases/document-processing/fintech/, retrieved on Sep. 8, 2023, 6 pages.
Kipf et al. "Semi-Supervised Classification with Graph Convolutional Networks." ArXiv abs/1609.02907, 2017, 14 Pages.
Velickovic et al. "Graph Attention Networks," ArXiv abs/1710.10903, 2018, 12 pages.
Elfwing et al. "Sigmoid-Weighted Linear Units for Neural Network Function Approximation in Reinforcement Learning," Neural networks: the official journal of the International Neural Network Society 107, 2018, 18 pages.
Yadati et al., "HyperGCN: Hypergraph Convolutional Networks for Semi-Supervised Classification." ArXiv abs/1809.02589, 2018, 18 pages.
United Kingdom Intellectual Property Office, "Notification of Grant," issued in connection with United Kingdom Patent Application No. 2112299.9, dated Aug. 29, 2023, 2 pages.
Intellectual Property of United Kingdom, "Notification of Grant ," issued in connection with United Kingdom Patent Application No. 2112299.9, mailed on Aug. 23, 2023, 2 Pages.
Hu et al., "Semi-supervised Node Classification via Hierarchical Graph Convolutional Networks." ArXiv abs/1902.06667, 2019, 8 Pages.
Loshchilov et al., "Decoupled Weight Decay Regularization." ICLR (2019). 19 Pages.
Guillaume et al., "FUNSD: A dataset for form understanding in noisy scanned documents", in International Conference on Document Analysis and Recognition (ICDAR), 2019, 6 pages.
Nathancy, "How do I make masks to set all of image background, except the text, to white?", stakoverflow.com, https://stackoverflow.com/questions/56465359/how-do-i-make-masks-to-set-all-of-image-background-except-the-text-to-white, Jun. 5, 2019, 5 pages.
Zhong et al., "Hierarchical Message-Passing Graph Neural Networks." ArXiv abs/2009.03717, 2020, 29 pages.
Chen et al., "HGMF: Heterogeneous Graph-based Fusion for Multimodal Data with Incompleteness." Proceedings of the 26th ACM SIGKDD International Conference on Knowledge Discovery & Data Mining (2020), 11 pages.
Dwivedi et al., "Benchmarking Graph Neural Networks." ArXiv abs/2003.00982, 2020, 49 pages.
Carbonell et al., "Named Entity Recognition and Relation Extraction with Graph Neural Networks in Semi Structured Documents," in International Conference on Pattern Recognition (ICPR), pp. 9622-9627, 2021, 6 pages.
Wang et al., "DocStruct: A Multimodal Method to Extract Hierarchy Structure in Document for General Form Understanding", in Empirical Methods in Natural Language Processing (EMNLP), pp. 898-908, 2020, 11 pages.
Zhu et al., "Heterogeneous Mini-Graph Neural Network and Its Application to Fraud Invitation Detection." 2020 IEEE International Conference on Data Mining (ICDM), 2020, 891-899, 9 pages.
Bandyopadhyay et al., "Hypergraph Attention Isomorphism Network by Learning Line Graph Expansion." 2020 IEEE International Conference on Big Data (Big Data) (2020): 669-678, 10 pages.
Dong et al. "HNHN: Hypergraph Networks with Hyperedge Neurons," ArXiv abs/2006.12278, 2020, 11 pages.
Gu et al., "UniDoc: Unified Pretraining Framework for Document Understanding." NeurIPS (2021). "UniDoc: UnifiedPretraining Framework for Document Understanding." NeurIPS (2021). 12 pages.
Tang et al., "MatchVIE: Exploiting Match Relevancy between Entities for Visual Information Extraction", in International Joint Conference on Artificial Intelligence (IJCAI), pp. 1039-1045, 2021, 7 pages.
Qian et al. "A region-based hypergraph network for joint entity-relation extraction", in Knowledge-Based Systems. vol. 228, 2021, 8 pages.
Xu et al., "LayoutLMv2: Multi-modal Pre-training for Visually-rich Document Understanding." ACL (2021), 13 pages.
Huang et al. "UniGNN: a Unified Framework for Graph and Hypergraph Neural Networks." IUCAI, 2021, 9 pages.
Ma et al., "Graph Attention Networks with Positional Embeddings." ArXiv abs/2105.04037, 2021, 13 pages.
Prabhu et al., "MTL-FoUn: A Multi-Task Learning Approach to Form Understanding", in International Conference on Document Analysis and Recognition (ICDAR), pp. 377-388, 2021, 5 pages.
Kim et al., "Donut: Document Understanding Transformer without OCR", arXiv, 2021, 29 pages.
Xu et al. "LayoutXLM: Multimodal Pre-training for Multilingual Visually-rich Document Understanding", arXiv, 2021, 10 pages.
Zhang et al. "Entity Relation Extraction as Dependency Parsing in Visually Rich Documents", in Empirical Methods in Natural Language Processing (EMNLP), 2021, 10 pages.
Nguyen et al. "End-to-End Hierarchical Relation Extraction for Generic Form Understanding", in International Conference on Pattern Recognition (ICPR), pp. 5238-5245, 2021, 8 pages.
Hwang et al. "Cost-effective End-to-end Information Extraction for Semi-structured Document Images", in Empirical Methods in Natural Language Processing (EMNLP), 2021, 9 pages.
Li et al.,"StrucTexT: Structured Text Understanding with Multi-Modal Transformers", in ACM International Conference on Multimedia (ACM Multimedia), pp. 1912-1920. 2021, 9 pages.
Li et al. "SelfDoc: Self-Supervised Document Representation Learning." 2021 IEEE/CVF Conference on Computer Vision and Pattern Recognition (CVPR) (2021): 5648-5656, 10 pages.
Davis et al., "Visual FUDGE: Form Understanding via Dynamic Graph Editing", in International Conference on Document Analysis and Recognition (ICDAR), 2021, 16 pages.
Powalski et al., "Going Full-TILT Boogie on Document Understanding with Text-Image-Layout Transformer," ICDAR, 2021, 17 pages.

(56) References Cited

OTHER PUBLICATIONS

Li et al., "StructuralLM: Structural Pre-training for Form Understanding." ArXiv abs/2105.11210 (2021), 10 pages.
Gu et al.,"XYLayoutLM: Towards Layout-Aware Multimodal Networks For Visually-Rich Document Understanding", in Conference on Computer Vision and Pattern Recognition ( CVPR), 2022, 10 pages.
Huang et al. "LayoutLMv3: Pre-training for Document AI with Unified Text and Image Masking." ArXiv abs/2204.08387 (2022), 10 pages.
Zhang et al.,"Multimodal Pre-training Based on Graph Attention Network for Document Understanding." ArXiv abs/2203.13530 (2022), 13 pages.
Park et al. "CORD: A Consolidated Receipt Dataset for Post-OCR Parsing. In Workshop on Document Intelligence," at NeurIPS 2019, 4 pages.
Wang et al. "LiLT: A Simple yet Effective Language-Independent Layout Transformer for Structured Document Understanding", in Annual Meeting of the Association for Computational Linguistics (ACL), 2022, 11 pages.
Datasetlist "Annotation tools for building datasets," Labeling tools—List of labeling tools, Datasetlist.com, [retrieved from:https://www.datasetlist.com/tools/], updated Dec. 2021, downloaded on Apr. 1, 2022, 12 pages.
United States Patent and Trademark Office, "Corrected Notice of Allowability," issued in connection with U.S. Appl. No. 17/883,309, dated Aug. 17, 2023, 2 Pages.
Gopal et al. "What is Intelligent Document Processing?" Nano Net Technologies, retrieved from <https://nanonets.com/blog/intelligent-document-processing/>, 2021, 21 pages.
International Searching Authority, "International Preliminary Report on Patentability," issued in connection with PCT No. PCT/US2021/039931, Jan. 12, 2023, 6 pages.
United States Patent and Trademark Office, "Notice of Allowance," issued in connection with U.S. Appl. No. 17/345,940, dated Jul. 7, 2023, 8 pages.
Canadian Intellectual Property Office, "Examiner's Report," issued in connection with Canadian Patent Application No. 3,124,868, dated Aug. 10, 2023, 5 pages.
Chen et al., "TextPolar: irregular scene text detection using polar representation," International Journal on Document Analysis and Recognition (IJDAR), 2021, published May 23, 2021, 9 pages.
Shen et al., "LayoutParser: A Unified Toolkit for Deep Learning Based Document Image Analysis," in International Conference on Document Analysis and Recognition (ICDAR), Jun. 1, 2021, 16 pages. [retrieved from: https://arxiv.org/pdf/2103.15348.pdf].
Hwang et al., "Spatial Dependency Parsing for Semi-Structured Document Information Extraction," in International Joint Conference on Natural Language Processing (IJCNLP), Jul. 1, 2021, 14 pages. [retrieved from: https://arxiv.org/pdf/2005.00642.pdf].
Hong et al., "BROS: A Pre-trained Language Model Focusing on Text and Layout for Better Key Information Extraction from Documents," arXiv (CoRR), Sep. 10, 2021, 13 pages. [retrieved from: https://arxiv.org/pdf/2108.04539.pdf].
Appalaraju et al., "DocFormer: End-to-End Transformer for Document Understanding," arXiv (CoRR), Sep. 20, 2021, 22 pages. [retrieved from: https://arxiv.org/pdf/2106.11539.pdf].
International Searching Authority, "International Preliminary Report on Patentability" mailed in connection With International Patent Application No. PCT/IB2019/000299, issued on Sep. 28, 2021,5 pages.
United States Patent and Trademark Office, "Final Office Action," issued in connection with U.S. Appl. No. 16/692,797, dated Oct. 27, 2021, 14 pages.
International Searching Authority, "Written Opinion of the International Searching Authority," issued in connection with PCT No. PCT/US2021/039931, Nov. 4, 2021, 4 pages.
International Searching Authority, "International Search Report," issued in connection with PCT No. PCT/US2021/039931, Nov. 4, 2021, 3 pages.
United States Patent and Trademark Office, "Advisory Action," issued in connection with U.S. Appl. No. 16/692,797, dated Feb. 16, 2022, 2 pages.
Github, "Doccano tool," Github.com, downloaded on Apr. 1, 2022, 12 pages. [retrieved from:https://github.com/doccano/doccano].
Github, "FIAT tool—Fast Image Data Annotation Tool," Github.com, downloaded on Apr. 1, 2022,30 pages. [retrieved from: https://github.com/christopher5106/FastAnnotationTool].
Datasetlist, "Annotation tools for building datasets," Labeling tools—List of labeling tools, Datasetlist.com, updated Dec. 2021, downloaded on Apr. 1, 2022, 12 pages. [retrieved from:https://www.datasetlist.com/tools/].
NielsenIQ Brandbank, "Nielsen Brandbank Product Library," Online Available. Retrieved on Apr. 1, 2022, 5 pages. [retrieved from: https://www.brandbank.com/us/product-library/].
United States Patent and Trademark Office, "Notice of Allowance and Fee(s)Due," issued in connection with U.S. Appl. No. 16/692,797, issued Apr. 5, 2022, 10 pages.
United States Patent and Trademark Office, "Corrected Notice of Allowability, "issued in connection with U.S. Appl. No. 16/692,797, issued Apr. 22, 2022, 3 pages.
International Searching Authority, "International Preliminary Report on Patentability," mailed in connection with International Patent Application No. PCT/US2020/061269,on May 17, 2022, 5 pages.
Datasetlist, "A tool using OpenCV to annotate images for image classification, optical character reading, . . . ," Datasetlist.com, dated Jul. 13, 2022, 30 pages.
United States Patent and Trademark Office, "Non-Final Office Action," issued in connection with U.S. Appl. No. 17/345,940, dated Aug. 18, 2022, 8 Pages.
Crandall et al., "Extraction of special effects caption text events from digital video," IJDAR, Department of Computer Science and Engineering, The Pennsylvania State University, 202 Pond Laboratory, University Park, PA, accepted Sep. 13, 2022, pp. 138-157, 20 pages.
United States Patent and Trademark Office, "Non-Final Office Action" , issued in connection with U.S. Appl. No. 17/075,675, issued Sep. 22, 2022, 12 Pages.
European Patent Office, "European Search Report," issued in connection with European U.S. Appl. No. 19/921,870, filed Oct. 12, 2022, 11 pages.
International Searching Authority, "Written Opinion," issued in connection with PCT No. PCT/US2022/034570, Oct. 20, 2022, 5 pages.
International Searching Authority, "International Search Report," issued in connection with PCT No. PCT/US2022/034570, Oct. 20, 2022, 3 pages.
United States Patent and Trademark Office, "Notice of Allowance," issued in connection with U.S. Appl. No. 17/075,675, issued Jun. 26, 2023, 8 pages.
United States Patent and Trademark Office, "Notice of Allowance," issued in connection with U.S. Appl. No. 17/364,419, filed Nov. 4, 2022, 10 pages.
Canadian Patent Office, "Examiner's Report," issued in connection with Canadian Patent Application No. 3,124,868, mailed on Nov. 10, 2022, 4 pages.
United States Patent and Trademark Office, "Corrected Notice of Allowability", issued in connection with U.S. Appl. No. 17/364,419, filed Nov. 15, 2022, 2 pages.
European Patent Office, "European Search Report," issued in connection with European patent appl. No. 22180113.7-1207, Nov. 22, 2022, 31 pages.
European Patent Office, "European Search Report," issued in connection with European patent appl. No. 22184405.3-1207, Dec. 2, 2022, 7 pages.
United States Patent and Trademark Office, "Non-Final Office Action," issued in connection with U.S. Appl. No. 17/379,280, dated Dec. 2, 2022, 14 Pages.
International Searching Authority, "International Preliminary Report on Patentability," issued in connection with PCT No. PCT/US2021/039931, issued Dec. 13, 2022, 5 pages.

(56) References Cited

OTHER PUBLICATIONS

United States Patent and Trademark Office, " Notice of Allowance", issued in connection with U.S. Appl. No. 17/364,419, filed Jan. 4, 2023, 2 pages.
United States Patent and Trademark Office, "Non-Final Office Action", issued in connection with U.S. Appl. No. 17/883,309, filed Jan. 20, 2023, 14 pages.
United States Patent and Trademark Office, "Corrected Notice of Allowability", issued in connection with U.S. Appl. No. 17/364,419, filed Feb. 15, 2023, 2 pages.
United Kingdom Patent Office, "Examination Report under section 18(3)," in connection with Great Britain Patent Application No. 2112299.9, issued Feb. 17, 2023, 2 pages.
United States Patent and Trademark Office, "Final Office Action" , issued in connection with U.S. Appl. No. 17/075,675, issued Mar. 7, 2023, 11 Pages.
United States Patent and Trademark Office, "Non-Final Office Action," issued in connection with U.S. Appl. No. 17/345,940, dated Mar. 16, 2023, 13 Pages.
United States Patent and Trademark Office, "Final Office Action," issued in connection with U.S. Appl. No. 17/379,280, dated May 5, 2023, 17 pages.
United States and Patent and Trademark Office, "Corrected Notice of Allowance and Fee(s) Due," issued in connection with U.S. Appl. No. 17/883,309, dated May 11, 2023, 9 pages.
European Patent Office, "Extended European Search Report," issued in connection with European Patent Application No. 22214553.4, dated May 17, 2023, 9 pages.
United States Patent and Trademark Office, "Advisory Action," issued in connection with U.S. Appl. No. 17/075,675, issued May 30, 2023, 3 pages.
A2IA, "Intelligent Automation Eliminates Manual Data Entry From Complex Documents," Artificial Intelligence & Image Analysis, White Paper, accessed on Jan. 30, 2019, 3 pages.
International Searching Authority, "International Preliminary Report on Patentability," issued in connection with International Patent Application No. PCT/US2022/034570, issued on Jan. 4, 2024, 7 pages.
A2IA, "Historic Document Conversion," Artificial Intelligence & Image Analysis, Industry Paper, accessed on Jan. 30, 2019, 4 pages.
Hui, "mAP (mean Average Precision) for Object Detection," Mar. 6, 2018, 2 pages. Retrieved from [https://medium.eom/@jonathan hui/map-mean-average-precision-for-object-detection-45c121a311731 on May 11, 2020, 2 pages.
United States Patent and Trademark Office, "Non-Final Office Action," issued in connection with U.S. Appl. No. 18/191,642, dated Feb. 7, 2024, 18 pages.
Villota et al. "Text Classification Models for Form Entity Linking," International Symposium on Distributed Computing and Artificial Intelligence, Jul. 13, 2022, 10 pages.
Kim et al., "OCR-free Document Understanding Transformer," European Conference on Computer Vision, Oct. 2022, 29 pages.
United States Patent and Trademark Office, "Non-Final Office Action," issued in connection with U.S. Appl. No. 17/598,792, dated Dec. 29, 2023, 17 pages.
European Patent Office, "Communication pursuant to Rules 70(2) and 70a(2) EPC," issued in connection with European Patent Application No. 20891012.5, dated Dec. 5, 2023, 1 page.
United States Patent and Trademark Office, "Advisory Action," issued in connection with U.S. Appl. No. 17/379,280, mailed on Jul. 18, 2023, 3 pages.
United States Patent and Trademark Office, "Corrected Notice of Allowability," issued in connection with U.S. Appl. No. 17/075,675, mailed on Oct. 10, 2023, 2 pages.
European Patent Office, "Extended European Search Report," issued in connection with European Patent Application No. 20891012.5, dated Nov. 17, 2023, 12 pages.
Oliveira et al., "A New Method for Text-Line Segmentation for Warped Documents," International Conference on Image Analysis and Recognition (ICIAR), Jun. 2010, 11 pages.
Hochreiter et al., "Long Short-Term Memory," Neural Computation, vol. 9, Nov. 15, 1997, 46 pages.
Leicester et al., "Using Scanner Technology to Collect Expenditure Data," Fiscal Studies, vol. 30, Issue 3-4, 2009, 29 pages.
Liu et al., "RoBERTa: A Robustly Optimized BERT Pretraining Approach," International Conference on Learning Representations, Apr. 30, 2020, 13 pages.
Garncarek et al., "Lambert: Layout-Aware Language Modeling for Information Extraction," International Conference on Document Analysis and Recognition (ICDAR), Sep. 5, 2021, 16 pages.
United States and Patent and Trademark Office, "Non-Final Office Action," issued in connection with U.S. Appl. No. 17/566,135, dated Mar. 27, 2024, 13 pages.
European Patent Office, "Communication pursuant to Article 94(3) EPC," issued in connection with European Patent Application No. 19 921 870.2-1207, on Apr. 9, 2024, 7 pages.
United States Patent and Trademark Office, "Non-Final Office Action," issued in connection with U.S. Appl. No. 18/476,978, dated Apr. 18, 2024, 20 pages.
United States Patent and Trademark Office, "Non-Final Office Action," issued in connection with U.S. Appl. No. 17/710,660, on May 28, 2024, 9 pages.
United States Patent and Trademark Office, "Notice of Allowance and Fee(s) Due," issued in connection with U.S. Appl. No. 17/598,792, dated Jun. 17, 2024, 9 pages.
United States Patent and Trademark Office, "Notice of Allowance and Fee(s) Due," issued in connection with U.S. Appl. No. 18/191,642, dated Jun. 17, 2024, 9 pages.
Canadian Intellectual Property Office, "Office Action," issued in connection with Canadian Patent Application No. 3,182,471, dated May 28, 2024, 5 pages.
Visich, "Bar Codes and Their Applications," Research Foundation of State University of New York, 1990, 59 pages.
United States Patent and Trademark Office, "Corrected Notice of Allowability," issued in connection with U.S. Appl. No. 17/598,792, dated Jul. 3, 2024, 2 pages.
United States Patent and Trademark Office, "Final Office Action," issued in connection with U.S. Appl. No. 17/566,135, dated Jul. 25, 2024, 17 pages.
United States Patent and Trademark Office, "Final Office Action," issued in connection with U.S. Appl. No. 18/476,978, dated Aug. 14, 2024, 22 pages.
International Searching Authority, "International Preliminary Report on Patentability," issued in connection with International Application No. PCT/US2023/011859, mailed on Aug. 15, 2024, 6 pages.
United States Patent and Trademark Office, "Notice of Allowance and Fee(s) Due," issued in connection with U.S. Appl. No. 17/598,792, dated Aug. 27, 2024, 9 pages.
United States Patent and Trademark Office, "Notice of Allowance and Fee(s) Due," issued in connection with U.S. Appl. No. 18/191,642, dated Aug. 28, 2024, 7 pages.
United States Patent and Trademark Office, "Non-Final Office Action," issued in connection with U.S. Appl. No. 17/710,649, dated Sep. 16, 2024, 12 pages.
United States Patent and Trademark Office, "Notice of Allowance and Fee(s) Due," issued in connection with U.S. Appl. No. 17/710,660, dated Sep. 25, 2024, 9 pages.
United States Patent and Trademark Office, "Advisory Action," issued in connection with U.S. Appl. No. 18/476,978, dated Oct. 7, 2024, 3 pages.
United States Patent and Trademark Office, "Notice of Allowance and Fee(s) Due," issed in connection with U.S. Appl. No. 17/566,135, dated Oct. 11, 2024, 9 pages.

\* cited by examiner

| 0022 2011235135 | | RUTA: RIT524 | | | FECHA DE ENTREGA: | | 07.05.2019 |
|---|---|---|---|---|---|---|---|
| ABTS 3 HERMANAS | | | | TEPEYAC S-N. 99999 SUNUAPA CENTRO | | | |
| MARIA INES | | | | | | | |
| ITO521 | | | PEDIDO DE CONTADO | | | | |
| PEDIDO | TRANSP | COD | DESCRIP | CAJ/BOT | PRECIO | IMPORTE | TIPO PEDIDO |
| 4835108285 | 412301202 | 000351 | LIF600M12P | 1 | 117.20 | 117.20 | VENTA DE CONTADO |
| 4835108285 | 412301202 | 000351 | LIF600M12P | 1 | 117.20 | 117.20 | VENTA DE CONTADO |
| 4835108285 | 412301202 | 000351 | LIF600M12P | 2 | 134.81 | 269.62 | VENTA DE CONTADO |
| 4835108285 | 412301202 | 000351 | LIF600M12P | 1 | 241.60 | 241.60 | VENTA DE CONTADO |
| 4835108285 | 412301202 | 000351 | LIF600M12P | 1 | 117.20 | 117.20 | VENTA DE CONTADO |
| 4835108285 | 412301202 | 000351 | LIF600M12P | 2 | 99.70 | 199.40 | VENTA DE CONTADO |
| 4835108285 | 412301202 | 000351 | LIF600M12P | 1 | 53.50 | 53.50 | VENTA DE CONTADO |
| 4835108285 | 412301202 | 000351 | LIF600M12P | 1 | 79.50 | 79.50 | VENTA DE CONTADO |
| 4835108285 | 412301202 | 000351 | LIF600M12P | 1 | 118.40 | 118.40 | VENTA DE CONTADO |
| 4835108285 | 412301202 | 000351 | LIF600M12P | 3 | 43.20 | 129.50 | VENTA DE CONTADO |
| 4835108285 | 412301202 | 000351 | LIF600M12P | 1 | 62.30 | 62.30 | VENTA DE CONTADO |
| SUB-TOTAL | | | | 15 | | 1,505.52 | |
| TOTAL A COBRAR CONT/PROM/RECCREDITO 1,505.52 | | | | | | | |
| TOT. CAJBOT | | | | 15 | | | |

FIG. 2A

CHILPANCINGO
RFC: PRO-84042358
MARIO PANI 100, PISO 7
FECHA: 29/04/2019     HORA: 10:10:55
BODEGA: MR0331 RUTA: HV0103
VENDEDOR: JOSE IVAN ROSAS MORALES
DOCUMENTO: 6369212523205321 9

CLIENTE: 1931000142
REFRESQUERIA 2000
AV. GUERRERO

ENTREGA: 30/40/2019
RUTA DE REPARTO: RHV103
                    ENTREGA

| CVE | DESCRIPCION | | | | IMPORTE |
|---|---|---|---|---|---|
| CANT | PRECIO | DESC | | R | 24 |
| 356 | COCA COLA 0.5 LT VIDRIO | | | | $184.00 |
| 1/0 | 184.00 | 0.00 | | | |
| 2838 | CC 355ML | LATA LEAN | NR | 12 PK | $249.00 |
| 2/0 | 124.50 | 0.00 | | | |
| 3/0 | TOTAL ENTREGA | | | | $433.00 |

2/0  TOTAL  ENVASE  DEVUELTO
BALANCE TOTAL:  CONTADO  $433.00

DESCUENTOS APLICAN ANTES DE IMPUESTOS A
PARTIR DEL 1 DE SEPTIEMBRE DE 2016, USTED PUEDE
OBTENER SUS FACTURAS. ENTRADO EN LA SIGUIENTE
LIGA: CLIENTASKOF.MX/CFDIPORTALCLIENTES/
USUARIO: NUM CLIENTE
CLAVE DE ACCESO: NUM CLIENTE
PARA SOPORTE MARCAR AL 01800-2233672 o
ENVIAR CORREO A:
SOPORTE FACTURACIENCSC.FEMSA.COM.MX
QUEJAS/SUGERENCIAS

FIG. 2B

DADOS DOS PRODUTOS E SERVICOS

| CD. PROD | DESCRICAO | NCM | CST | CFOP | UND | QTD | VL. UNIT | VL. DESC | TOTAL | BC ICMS | VL. ICMS | ALIQ. ICMS | ALIQ. IPI |
|---|---|---|---|---|---|---|---|---|---|---|---|---|---|
| 0000000132 | COCA COLA KS ULTRA 290 ML 24 WN MENSAGEM:VAL:PROXIMADO DOS TRIBUTOS | 22021000 | 060 | 5.405 | CX | 1,0000 | 42,009000 | | 12.00 | 0.00 | | | |
| 0000000130 | COCA COLA 2 L 12 LISC MENSAGEM:VAL:PROXIMADO DOS TRIBUTOS | 22021000 | 060 | 5.405 | CX | 1,0000 | 24,009000 | | 24.00 | 0.00 | | | |
| 0000000195 | COCA COLA REL D1 M UX12 MENSAGEM:VAL:PROXIMADO DOS TRIBUTOS | 22021000 | 060 | 5.405 | CX | 3,0000 | 48,240000 | | 144.72 | 0.00 | | | |
| 0000000106 | COCA COLA REL D1 M UX12 MENSAGEM:VAL:PROXIMADO DOS TRIBUTOS | 22021000 | 060 | 5.405 | EB | 10,0000 | 32,340800 | | 323.40 | 0.00 | | | |
| 0000000308 | COCA COLA REL D1 M UX12 MENSAGEM:VAL:PROXIMADO DOS TRIBUTOS | 22021000 | 060 | 5.405 | EB | 2,0000 | 27,369000 | | 54.70 | 0.00 | | | |
| 0000000406 | COCA COLA REL D1 M UX12 MENSAGEM:VAL:PROXIMADO DOS TRIBUTOS | 22021000 | 060 | 5.405 | EB | 2,0000 | 27,360000 | | 54.72 | 0.00 | | | |
| 0000000406 | MENSAGEM:VA APROXIMADO DOS TIRIBUTOS | 22021000 EX001 | 060 | 5.405 | CX | 1,0000 | 12,010000 | | 12.01 | 0.00 | | | |

FIG. 4

| FILE NAME | | | | SECOND WINDOW | NEXT |
|---|---|---|---|---|---|
| | CVE | DESCRIPCION | | | |
| | CANT | PRECIO | DESC | IMPORTE | |
| | 501 | COCA COLA 2.5 LT REF-PET 8 C | | | |
| | 470 | 184.30 | 0.00 | $737.20 | |
| | ------------------------------------------------- | | | | |
| | 4/0 | TOTAL ENTREGA | | $737.20 | |
| | | DEVOLUCION | | | |
| | CVE | CANT | DESCRIPCION | | |
| | 170451 | 4/0 | CAJA PLASTICA 8 CAV. 2.5 | | |
| | 170460 | 4/0 | ENV CC 2.5LTS REFPET8 | | |

LINE ITEMS — +ADD A NEW LINE
LINE NO. CONNECT — ☐ SHOW ALL
1

ERRORS
☐ WRONG ANGLE OR DISTANCE
☐ OUT OF SCOPE
☐ BLURRY
■ NONE

1202:
```
                445   COCA COLA 3 LT PET NR 4 PK
                2/0   141.90   0.00        $283.80
                650   CC PET  1LTNR 12 PK
                1/0   202.10   0.00        $202.10
                1740  SIDRAL MZN 3L NR PET 4PK
                2/0   106.80   0.00        $213.60
                2584  COCA COLA 3 LT PET NR 12 PK
                1/0   74.59    0.00        $74.59
                84091 CIEL 600 ML PET NR 12 G
                1/0   80.00    0.00        $80.00
                8/0   TOTAL ENTREGA        $979.59
```

FIG. 14

LABELING
SEARCH ENTITY 🔍
☐ PRODUCT_QUANTITY(0) 👁  ☐ PRODUCT_CODE(6) 👁  ☐ PRODUCT_TOTAL(6) 👁
☐ PRODUCT_DESC(6) 👁  ☐ PRODUCT_PRICE(6) 👁

LINE ITEMS — +ADD A NEW LINE
LINE NO. CONNECT — ☐ SHOW ALL
390 CELL MINERAL 600 ML PCT 12P

ERRORS

1202:
```
FILE NAME:
                              ENTREGA
        CVE    DESCRIPCION    PRECIO DESC    IMPORTE
        392    CIEL 600 ML PET NR 12 G
        1/0    125.00   0.00              $125.50
        445    COCA COLA 3 LT PET NR 4 PK
        2/0    141.90   0.00              $283.80
        650    CC PET  1L TNR 12  PK
        1/0    202.10   0.00              $202.10
        1740   SIDRAL MZN 3L NR PET 4PK
        2/0    106.80   0.00              $213.60
        2584   COC-COLA 250ML  PET NR 12PK
```

METHODS, SYSTEMS, ARTICLES OF MANUFACTURE AND APPARATUS TO LABEL TEXT ON IMAGES

RELATED APPLICATION

This patent claims the benefit of U.S. Provisional Patent Application No. 63/220,789, which was filed on Jul. 12, 2021. U.S. Provisional Patent Application No. 63/220,789 is hereby incorporated herein by reference in its entirety. Priority to U.S. Provisional Patent Application No. 63/220,789 is hereby claimed.

FIELD OF THE DISCLOSURE

This disclosure relates generally to image recognition and, more particularly, to methods, systems, articles of manufacture, and apparatus to label text on images.

BACKGROUND

Measurement companies have enlisted consumers as panelists to collect information about retail purchasing habits. For example, the Nielsen Company's Homescan™ panels requires panelists to scan bar codes of products purchased at stores. Some studies include collecting receipts and/or imaging receipts from purchasers. Labeling text present on images (e.g., on an image of a receipt) can be a daunting and time-consuming task. While some tools exist that provide a user with an interface for drawing bounding boxes on an image, to mark the presence of text, these existing tools lack an intuitive and interactive interface to deal with text on image.

BRIEF DESCRIPTION OF THE DRAWINGS

FIGS. 2A and 2B are illustrations of example images of purchase invoices.

FIG. 4 illustrates example output from an example decoding service.

FIG. 7 illustrates an example retrieved image to be processed to label images by examples disclosed herein.

FIG. 10 illustrates a portion of an example captured image having numerous separate text boxes to be labeled by examples disclosed herein.

FIG. 11 illustrates the portion of the example captured image of FIG. 10 with an entity panel generated by examples disclosed herein to label images having text information.

FIGS. 13 and 14 illustrate the example portion of the captured image of FIG. 12 and an example line item control panel generated by examples disclosed herein to label images having text information.

Figure 1:
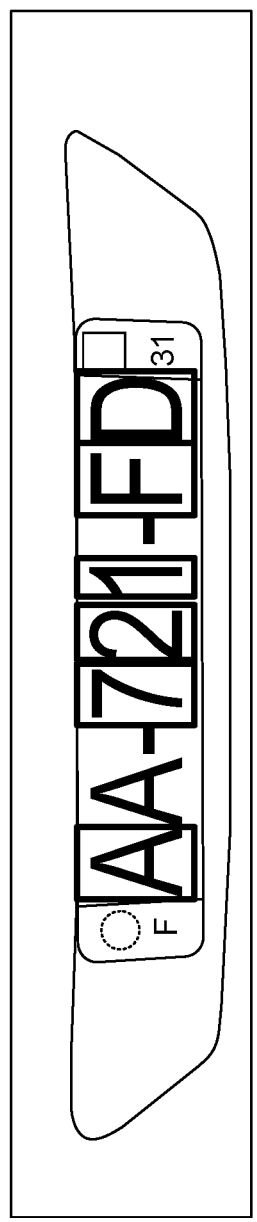
FIG. 1 is an illustration of example results of a region labeling tool on images with text content.

In general, the same reference numbers will be used throughout the drawing(s) and accompanying written description to refer to the same or like parts. The figures are not to scale As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Some organizations (e.g., consumer monitoring companies, etc.) are interested in collecting and processing documents such as, for example, receipts and/or invoices (e.g., from retailers). These organizations collect receipts from cooperating consumers (e.g., panelists) and process them to determine information about consumers and retailers. Cooperating consumers may scan and/or photograph their receipts and then send the receipts to an interested entity/organization. The interested organization transcribes, digitizes, and stores the receipts in one or more databases. The interested organization may also extract relevant fields from the receipts (e.g., retailer name, product names, item codes, item prices, price total, date, and time, etc.). In some examples, the interested organization aggregates the gathered receipt information to produce reports including market research metrics.

Analyzing documents such as, for example images of receipts, includes extracting the text from the digitized versions of the receipts (e.g., from images of receipts) provided by consumers using optical character recognition (OCR). OCR engines, software-implemented processes and/or logic circuitry analyze images, recognize text, and transcribe the text in a computer-readable form. Generally, OCR engines are able to accurately recognize, detect, and transcribe text in images. However, in some examples, OCR engines struggle to properly align and arrange detected words in receipts because receipts are often crumpled (e.g., the underlying paper of the receipt is wrinkled) and/or otherwise exhibit conditions that prohibit the acquisition of accurate OCR data. In addition, the viewpoint of a captured image of the digitized receipt, the perspective of the captured image of the digitized receipt, and/or the receipts vary greatly in layout. In some examples, the receipt layout contains ordered information. For example, information corresponding to items and their respective prices are often horizontally aligned across a receipt. Accordingly, failure to properly align text in a receipt reduces the usefulness of a scanned receipt by improperly correlating unassociated items and their prices, and/or failing to correlate particular artifacts of the receipt that are related to particular item(s).

Analysis of receipts greatly assist market researchers to appreciate consumer behaviors with respect to particular retailer locations and/or geographies of interest. However, the volume of such receipts is too great to be practically processed on a manual basis. While machine learning (ML) and artificial intelligence (AI) techniques help to automate such voluminous tasks, such techniques require training with labelled images. In an effort to improve the accuracy of ML/AI techniques, relatively large numbers of labelled images are required to train ML/AI circuitry and/or algorithms. Just as the volume of receipts to process is too great for manual processing, the volume of labelled images is also a task that is too laborious for manual human processing. For instance, each labelled receipt requires that all text boxes identified by OCR techniques contain accurate information (e.g., detected words for products), accurate categories (e.g., particular category information associated with the detected words for products), and that particular groups of the text boxes are properly grouped to represent a single product/item. Additionally, even if manual efforts are applied to label OCR images, such human efforts introduce discretionary errors that produce erroneous results.

Systems, methods, apparatus, and articles of manufacture disclosed herein correct the above-noted deficiencies by post-processing the output of an image previously processed by an OCR technique(s) (e.g., an OCR engine output to label and/or annotate detected text). In some examples, the OCR engine generates bounding boxes corresponding to strings of identified characters. In some examples disclosed herein, the output of the OCR engine is corrected to properly connect identified text that is related. In some examples, entities or categories on the image are tagged and/or linked. In some examples, lines are identified, tagged, and/or rearranged. In some examples, metadata is added to the image labeling. Throughout this disclosure forms of the terms "label," "labeling," etc. are used interchangeably with corresponding forms of the terms "annotate," "annotation," "annotating," etc. Throughout this disclosure the terms "images" and "documents" may also be used interchangeably. For example, documents/images may be presented, transmitted, analyzed, labeled, and/or annotated. A document/image may be in electronic form or in physical form (e.g., printed to paper).

FIG. 1 is an illustration of example results of a region labeling tool on images with text. Examples disclosed herein may implement a region labeling system and analyze text in an image. Examples disclosed herein may mark the letters present on the image and may assign the text to one of a plurality of predefined 26 (A-Z) characters and/or ten (0-9) numbers as shown in FIG. 1. In other examples, other characters may be used including, for example characters used in languages other than English, mathematical symbols, currency symbols, and/or other special characters. Unlike traditional OCR systems, examples disclosed herein may be used to provide additional mechanisms to group and categorize the words that can be used in natural language processing tasks. For instance, examples disclosed herein may be used to present region labeling tools analyze the image in FIG. 1 to combine the letters AA-721-FD into one entity (e.g., a vehicle plate number) and a series of numbers such as the number 31 into another category (e.g., an expiration date).

Examples disclosed herein may present tools (e.g., user interface tools) to label the text, such as presenting one or more tools to label text in images based on annotation requests. In some examples, the annotation requests are received or obtained by, for example, one or more interfaces and/or interface circuitry. In some examples disclosed herein, a tool is invoked to correct the text output by the OCR circuitry and to identify one or more entities (or categories or fields) in the text.

In some scenarios, suppliers sell goods to retail stores and the transactions are formalized with printed purchase invoices. These documents contain text organized in several formats that include a form region of key-value pairs with miscellaneous information (e.g., invoice date, contact details, transaction IDs, etc.); a list of purchased items and their related facts (e.g., description/name, quantities, prices, taxes, discounts, product codes, etc.); additional information that identifies the seller (e.g., supplier) and buyer (e.g., retailer or consumer), disclaimers and/or other artifacts. Some examples of images of purchase invoices are depicted in FIGS. 2A-2B. Images including documents such as, for example, the receipt(s) and/or invoice(s) of FIGS. 2A-2B may be transmitted to, input in, received by, obtained by, sent to, and/or otherwise accessed by examples disclosed herein via, for example, interface circuitry. As shown in the illustrated examples, these images may include much text. Conventional labeling techniques may take hours to annotate images such as these. For instance, conventional labeling techniques may rely on human effort that consumes a great deal of time and is subject to discretionary error. Examples disclosed herein provide tools (e.g., user interface tools) to facilitate the annotation process and greatly reduce the time to complete annotation/labeling and reduce a degree of errors that are otherwise caused by human discretion.

Consumer monitoring and/or measurement organizations (e.g., market analysts) can obtain information/data and/or audit data related to consumer purchases to collect and/or develop facts (e.g., data concerning sales) of one or more products of interest. In some examples, these organizations use tools included in mobile applications that allow the organization to perform audits and observations of an establishment (e.g., a retail store). The platform in such mobile applications combines functionality from multiple existing applications into an integrated system. In some examples, the mobile application communicates with one or more back office or factory systems of the organization that may be distributed throughout the world. Example tools and platforms disclosed herein may further be incorporated into machine learning and artificial intelligence workflows to improve data collection processes. In some examples disclosed herein, the collection of purchased items and related facts in invoices, receipts, and/or other documents is automated to reduce manual efforts and increase the quality of the collected data. A wide scope in the number of invoice formats, document types, suppliers, and/or stores can be processed in tools disclosed herein.

Figure 3:
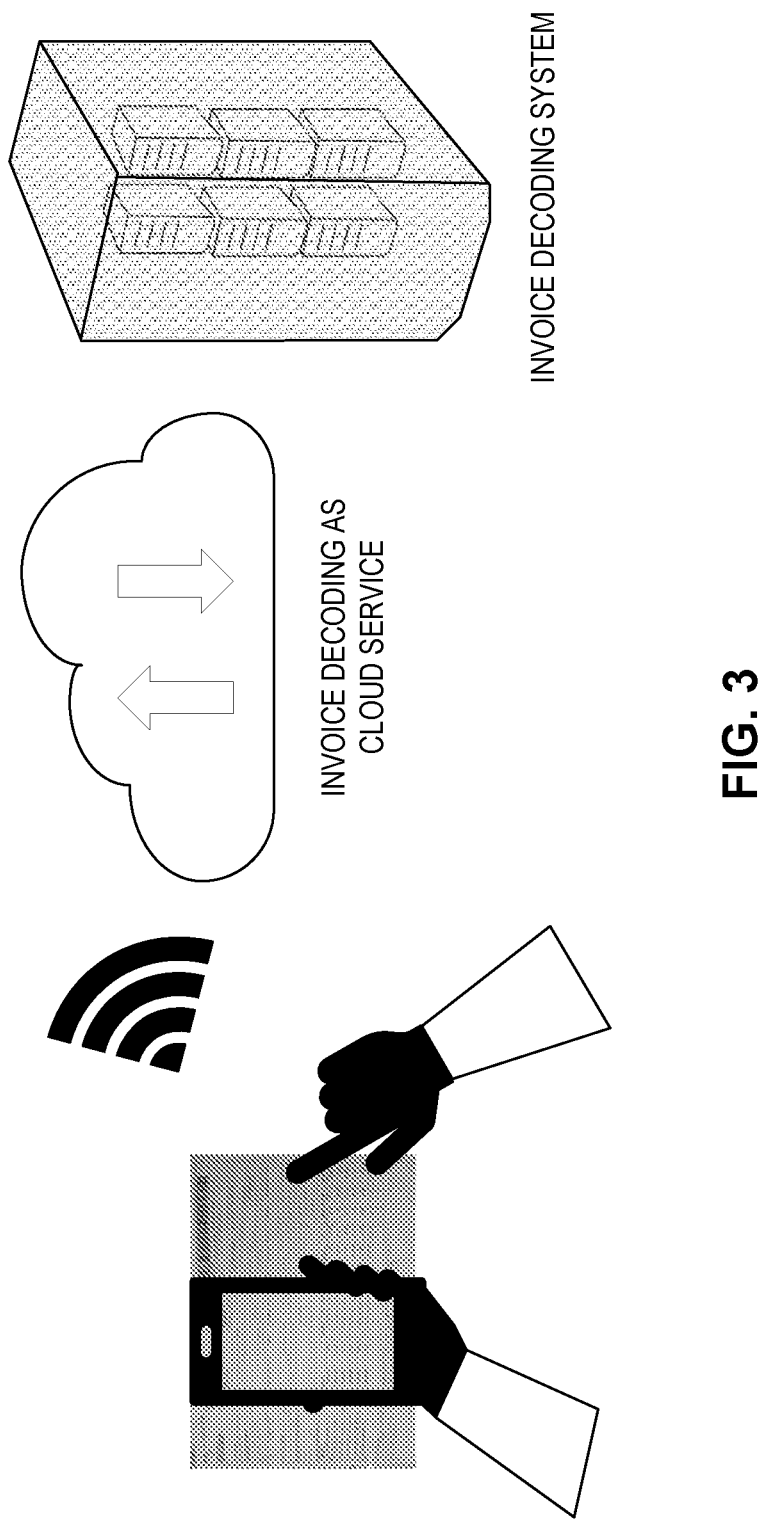
FIG. 3 illustrates an example decoding service.

Examples disclosed herein capture documents using artificial intelligence/machine learning models to extract key elements like product description, product quantity, product price, date, and other details. An example artificial intelligence/machine learning system is shown in FIG. 3, which implements an example decoding service for remote devices, one or more cloud services, and an example decoding system (e.g., servers uniquely structured to facilitate examples disclosed herein). Example gathered details including an example output from a decoding service is shown in FIG. 4. Quality annotated data facilitates the development of effective artificial intelligence/machine learning models. Models developed using artificial intelligence/machine learning technologies utilize the annotated data (the labeled text) and learn to solve specific tasks based on the annotated data. Tools disclosed herein help annotators (e.g., humans) quickly label entities (e.g., categories such as, for example, product descriptions) and link the entities, which expeditiously creates quality annotated data on documents like invoices and receipts. Stated differently, the ability for AI/ML systems to analyze captured image data for different purposes depends on such AI/ML systems having properly trained models, which benefits from labeled data that is accurate. Additionally, such AI/ML systems require relatively large numbers of samples of labeled data. Examples disclosed herein improve both (a) the quality of labeled images to be provided to AI/ML systems and (b) the speed at which accurate labeled images can be generated.

Figure 5:
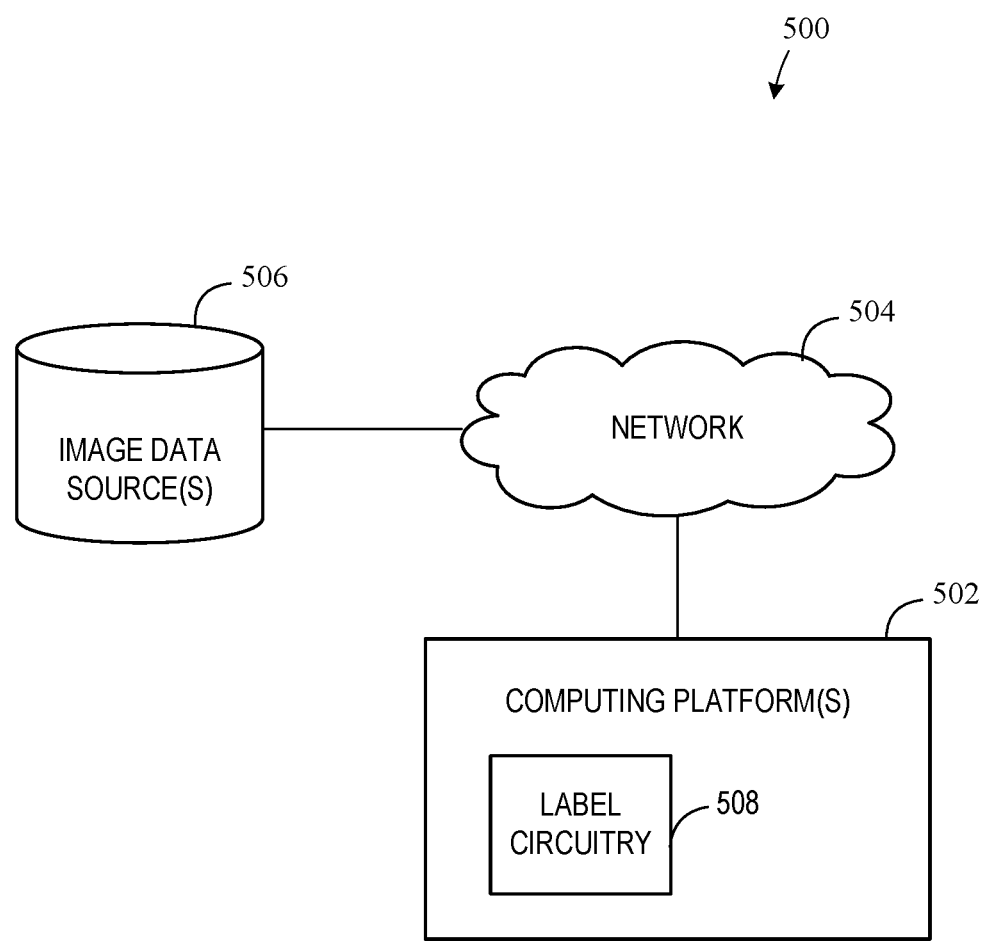
FIG. 5 is a block diagram of an example label system to label images containing text information.

FIG. 5 is a block diagram of an example label system 500 to label text on images in a manner that improves resource utilization efficiency, reduces reliance upon manual processing, and reduces erroneous labeled data that, if not detected, causes erroneous results in subsequent AI/ML services. The example label system 500 of FIG. 5 may be instantiated (e.g., creating an instance of, bring into being for any length of time, materialize, implement, etc.) by processor circuitry such as a central processing unit executing instructions. Additionally or alternatively, the example label system 500 (and/or structure/circuitry therein) of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

As described above, FIG. 5 illustrates an example label system 500 to label text on images. In the illustrated example of FIG. 5, the label system 500 includes an example computing platform 502 communicatively connected to any number of networks 504 and/or any number of image data sources 506. While the illustrated example of FIG. 5 shows the example computing platforms 502 connected to the example image data sources 506 via the example network 504, in some examples the example image data sources 506 may reside on and/or in the example computing platforms 502 and/or otherwise connected directly thereto. The example computing platform 502 includes example label circuitry 508 to label text on images, as described above and in further detail below. Generally speaking, images of receipts, invoices, etc. are saved in the example image data sources 506. In some examples, the saved images have been processed on a prior occasion with OCR services, while in some examples the saved images do not have any embedded OCR data therein. As described in further detail below, examples disclosed herein enable modification of the saved images by adding OCR data and/or changing the OCR data. Any changes to a previously saved image in the example image data sources 506 may be re-saved to the same image data sources 506 (e.g., one or more databases, one or more hard drives, one or more cloud storage location(s)/services, etc.).

Figure 6:
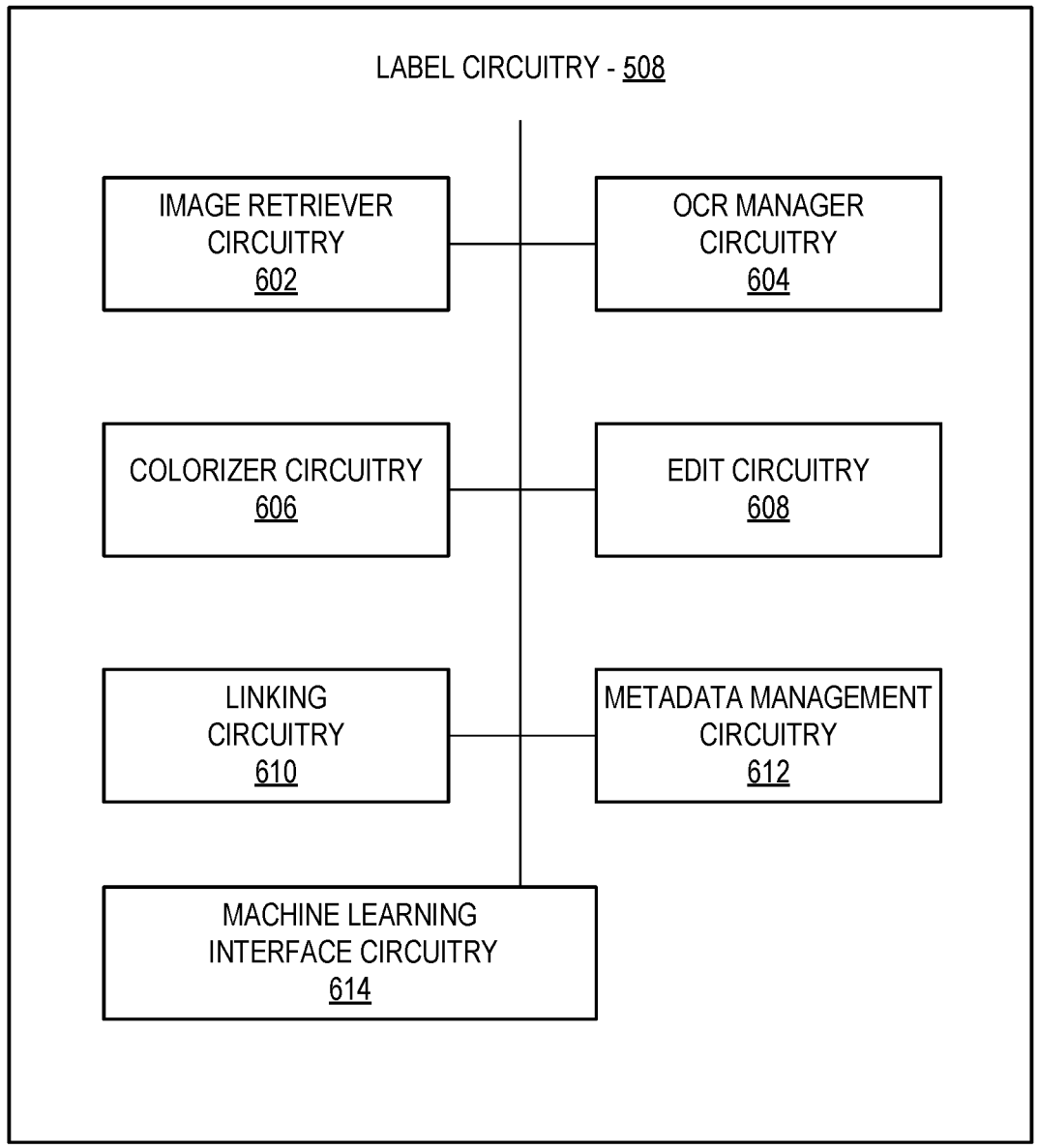
FIG. 6 is a block diagram of an example implementation of the label circuitry of FIG. 5 to label images containing text information.

FIG. 6 is a block diagram of an example implementation of the label circuitry 508 of FIG. 5. In the illustrated example of FIG. 6, the label circuitry 508 includes example image retriever circuitry 602, which may perform the tasks of the example interface described above. Additionally, the example label circuitry 508 includes example OCR manager circuitry 604, example colorizer circuitry 606, example edit circuitry 608, example linking circuitry 610, example metadata management circuitry 612 and example machine learning interface circuitry 614.

In operation, the example image retriever circuitry 602 processes an image, such as an image received and/or otherwise retrieved from one or more systems that processes images with OCR techniques to derive OCR data indicative of discovered text (e.g., letters, words, sentences, numbers, etc.). The example OCR manager circuitry 604 is to facilitate verification, overwriting and/or correction of text box information, as described in further detail below. The example edit circuitry 608 is to facilitate editing of particular groups of text boxes, such as text boxes that are to be associated with a same entity value (e.g., product description, product quantity, product price, etc.), as described in further detail below. The example linking circuitry 610 is to facilitate grouping of particular groups of text boxes that are to be associated with a same product, such as text boxes that span multiple lines of a receipt that correspond to a single purchased item, as described in further detail below. The image retriever circuitry 602, the OCR manager circuitry 604, the colorizer circuitry 606, the edit circuitry 608, the linking circuitry 610, the metadata management circuitry 612 and/or the machine learning interface circuitry 614 may be implemented by processor circuitry as configured by the machine readable instantiation (e.g., software) and/or by special purpose logic circuitry (e.g., an ASIC) as explained below.

Returning to the illustrated example of FIG. 6, the example image retriever circuitry 602 retrieves an image from the example image data source 506. In some examples, the retrieved image has been processed on a prior occasion by one or more OCR services, while in some examples the retrieved image has not yet been processed by the one or more OCR services. In the event the example OCR manager circuitry 604 determines that the retrieved image has not been processed by one or more OCR services (e.g., via the OCR manager circuitry 604 parsing, scanning and/or otherwise examining the retrieved image), the example OCR manager circuitry 604 invokes one or more OCR services for the retrieved image. Once the OCR services have been completed on the retrieved image, or in the event the retrieved image has already been processed by the one or more OCR services, the example colorizer circuitry 606 renders color outlines around text boxes identified by the one or more OCR services.

FIG. 7 illustrates an example retrieved image 702 (e.g., a portion of a receipt from a retailer) in which the example colorizer circuitry 606 has rendered color outlines around the text boxes. In the illustrated example of FIG. 7, a first example text box 704 has been rendered with a blue outline color surrounding the word "CANT" (which is Spanish for 'quantity'), a second example text box 706 has been rendered in a pink outline color surrounding the word "PRECIO" (which is Spanish for 'price'), and a third example text box 708 has been rendered in a yellow outline color surrounding the word "DESC" (e.g., 'description'). While the aforementioned three example color-outlined text boxes are described above, the illustrated example of FIG. 7 includes other examples of text box outlining performed by the example colorizer circuitry 606. The example colorizer circuitry 606 determines which color to apply to borders (outlines) of the text boxes in any number of ways. In some examples, the colorizer circuitry 606 assigns a particular color outline in a random manner, such that human readable attempts to review the image can easily locate one text box from another text box. In some examples, the colorizer circuitry 606 assigns a first color based on a character count of the text box (e.g., a single character text box is outlined with a first color, a double character text box is outlined with a second color, etc.).

In the illustrated example of FIG. 7, text boxes generated by the example OCR manager circuitry 604 (or text boxes generated by a previously-performed OCR services) do not show corresponding OCR data (aside from the text box boundary graphics and their associated colors). Generally speaking, OCR data also includes information corresponding to characters or words detected by the OCR services. As described above, OCR techniques and systems may exhibit errors when generating corresponding OCR data associated with an analyzed image. Stated differently, just because an image has been processed by OCR services does not mean that the OCR data correctly identifies the proper contents within each text box.

Figure 8:
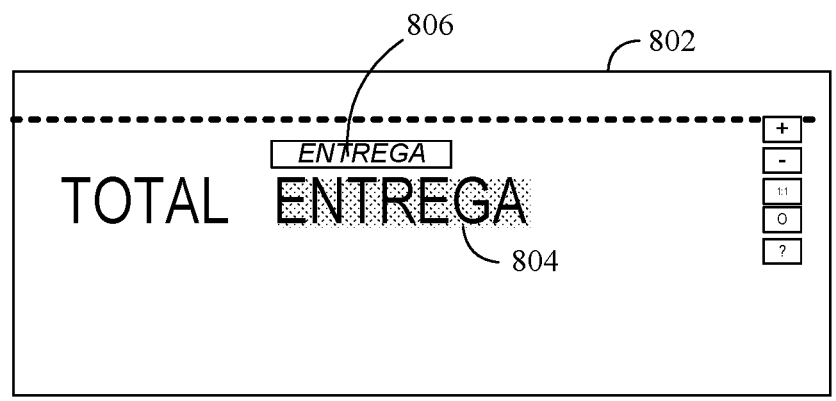
FIG. 8 illustrates a portion of the example retrieved image of FIG. 7 having a detected text box and corresponding OCR text data.

In an effort to permit reviewing personnel to assess the validity of the OCR data corresponding to an image, the example OCR manager circuitry 604 determines whether to render the OCR data next to all text boxes, or whether to render the OCR data next to text boxes that are individually selected. Rendering OCR data next to all text boxes or just some may be a configuration setting based on user preferences. FIG. 8 illustrates a portion of a captured image 802 in which only a single text box 804 is selected and its corresponding OCR data 806 is rendered in proximity to that text box 804. The example OCR data 806 is rendered by the OCR manager circuitry 604 as an OCR text prompt 806. In some examples, the OCR text prompt 806 is a graphic that "hovers" in an area of the GUI proximate to the corresponding text box. The OCR data of the text prompt 806 includes the word "ENTREGA" (which translates to "delivery" in English). Selection of the single text box 804 may be invoked when a mouse pointer or digitizer cursor hovers on or near the example text box 804, while in other examples one or more text boxes may be selected in any other manner. While not shown in the illustrated example of FIG. 8, in some examples the OCR manager circuitry 604 renders OCR data proximate to (e.g., next to) all text boxes within an image to permit efficient review by labelling personnel.

Figure 9:
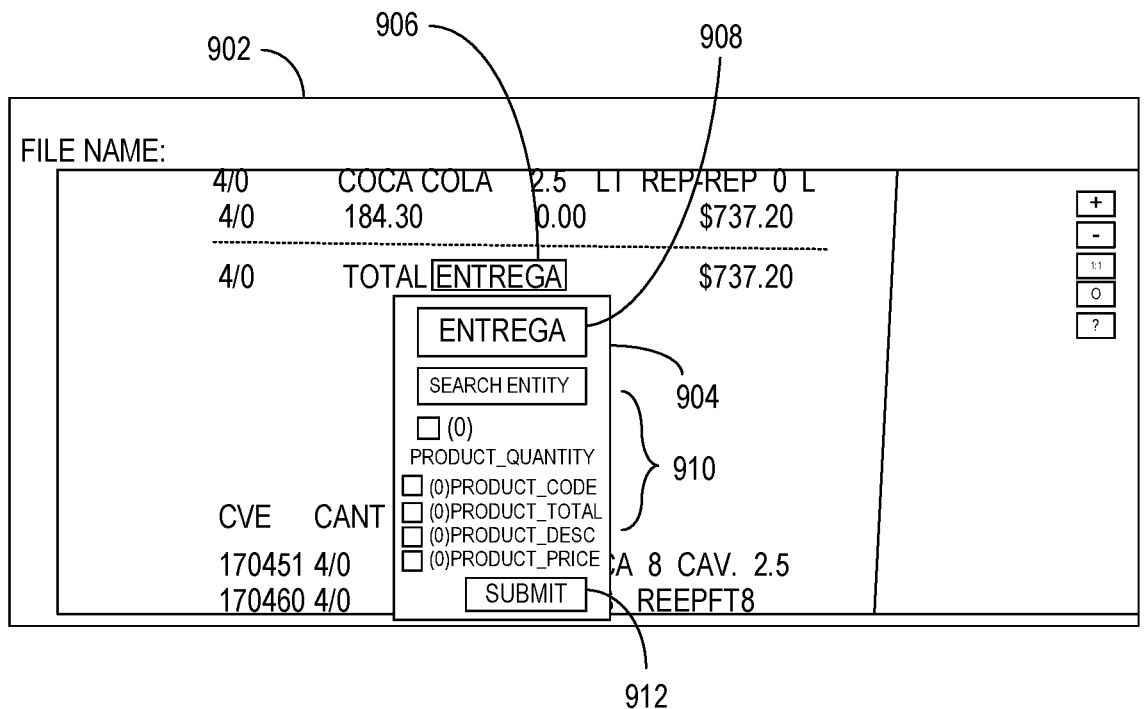
FIG. 9 illustrates an example retrieved image processed by one or more OCR services and including an example editing interface facilitated by examples disclosed herein.

In the event OCR data is incorrect and/or otherwise is to be modified, the example edit circuitry 608 renders an editing interface. FIG. 9 includes an example portion of a captured image 902 that has been processed by one or more OCR services. In the illustrated example of FIG. 9, the edit circuitry 608 renders the editing interface 904 proximate to a selected text box 906. The example editing interface 904 of FIG. 9 includes and/or otherwise displays different types of OCR data corresponding to the text box 906, including OCR text 908 extracted from the captured image 902 and entity information 910. The example OCR text 908 of the editing interface 904 is an editable field that can accept modifications, such as alternate spelling of previously detected text (e.g., in the event of OCR processing errors caused by, for example, poor image quality). The example editing interface 904 also permits entry of the entity information 910 corresponding to the text box currently in-focus, in which the entity information includes, but is not limited to, a product quantity designation, a product code designation, a product total designation, a product description designation, or a product price designation. After one or more changes to the example editing interface 904, such changes are associated with and/or otherwise linked to the corresponding text box 906 (e.g., in response to selection of a submit icon 912). Additionally, such changes are saved as metadata associated with the retrieved image back to, for example, the image data source 506 (e.g., a database) for later retrieval and/or use by one or more analysis systems (e.g., an AI/ML system to identify patterns corresponding to products derived from invoice images).

In some examples, captured images include numerous text boxes having detected OCR data (e.g., numerous instances of product descriptions, numerous instances of product prices, numerous instances of product codes, etc.). While the illustrated example of FIG. 9 includes examples to permit labelling and/or modification of such text boxes, efforts to perform such labelling and/or modification on a one-by-one basis is time-consuming. For instance, the labelling personnel would need to individually select each text box, open its contents, verify it represents an accurate extraction of OCR text, and associate an appropriate entity value (e.g., product description, product price, etc.) with the text box. However, examples disclosed herein facilitate a manner of labelling and/or modification of text boxes in a more efficient manner.

Figure 10:
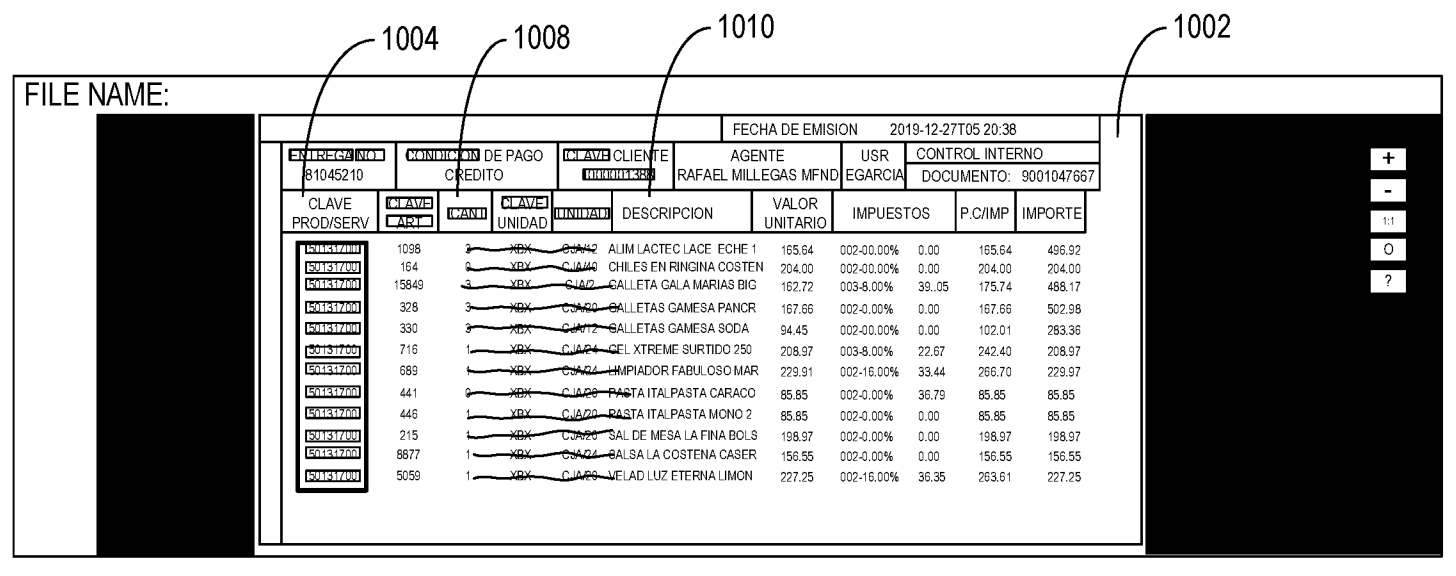

FIG. 10 illustrates an example portion of a captured image 1002. In the illustrated example of FIG. 10, the captured image 1002 includes, in part, a product code column 1004, a quantity column 1008 ("CANT"), and a description column 1010. Considering that the example portion of the captured image 1002 includes twelve (12) rows, the amount of time to be spent assigning entity information to the image 1002 on a one-by-one (e.g., text box by text box) basis would be prohibitively long. Additionally, such one-by-one labelling is subject to human error when the labelling personnel inadvertently skips one or more text boxes during the labelling effort. To improve labelling efficiency and reduce human error, the example edit circuitry 608 enables a graphical user interface (GUI) to facilitate selection of two or more text boxes. The example GUI enabled by the edit circuitry includes any number of selection functions, such as an outline drag function to create a rectangular outline of two or more text boxes via mouse dragging.

Figure 11:
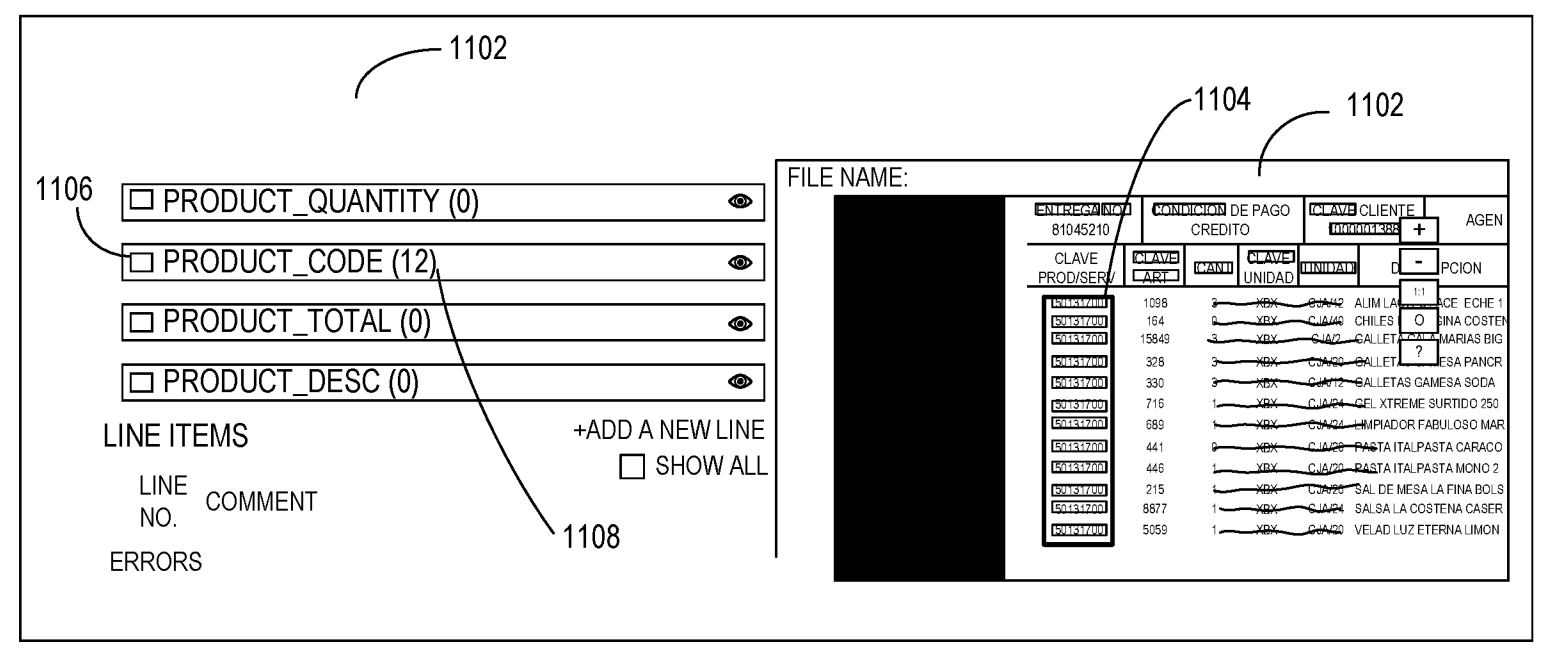

FIG. 11 illustrates the example portion of the captured image 1002 of FIG. 10 and an example entity panel 1102 corresponding to the two or more selected text boxes 1104 in the captured image 1002. The example edit circuitry 608 renders the example entity panel 1102 and causes the two or more selected text boxes 1104 to be associated with a particular entity type, such as an example product code entity type 1106. Additionally, the example edit circuitry 608 identifies how many text boxes have been selected and places that value adjacent to the selected entity type (see item 1108). In the illustrated example of FIG. 11, the edit circuitry 608 renders the value "12" (see item 1108) next to the selected product code entity type 1106. As such, the rendered count of selected text boxes enables verification that one or more text boxes have not been skipped and/or otherwise overlooked.

In some examples, captured images, that have been processed by one or more OCR services, exhibit product information that spans and/or otherwise consumes more than a single horizontal row of the captured image (e.g., a receipt from a retailer, a purchase order, an invoice, etc.). To illustrate, FIG. 12 includes a portion of a captured image 1202 (e.g., an invoice) that includes product code information 1204, product description information 1206, individual item price information 1208, quantity information 1210, and total price information 1212, among other details. Worth noting is that some of the information for a single product appears in a first row 1214, and some of the information for that same single product appears in a second row 1216. While OCR services are helpful to digitize and/or otherwise capture computer-readable information indicative of human readable text from a captured image, such OCR services fail to identify whether particular text boxes are related to one another. Examples disclosed herein enable text boxes to be linked, thereby associating text boxes in a manner that identifies all information corresponding to a product.

Figure 12:
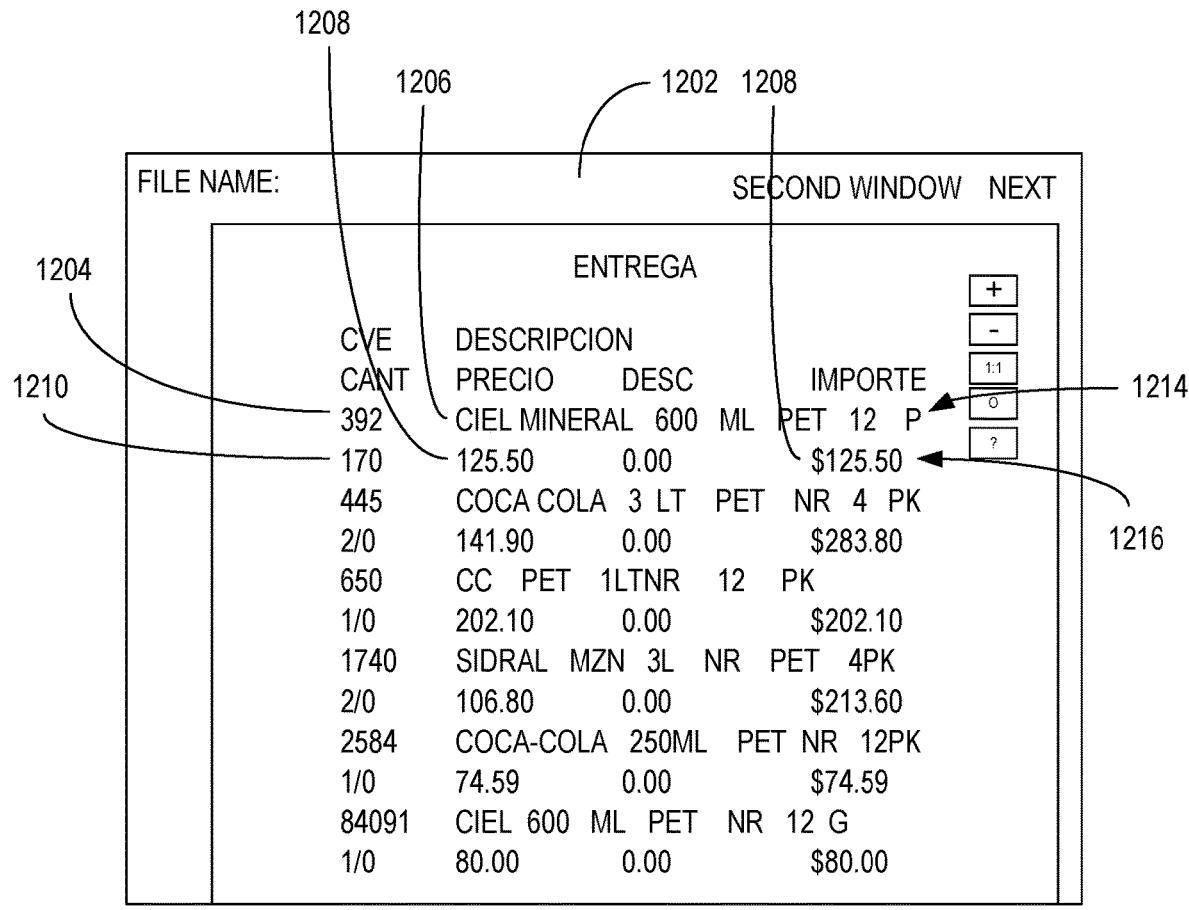
FIG. 12 illustrates a portion of a captured image having product information located on multiple different rows.

FIG. 13 includes the example portion of the captured image 1202 of FIG. 12 that is rendered, by the example linking circuitry 610, adjacent to an example line item control panel 1302. In the illustrated example of FIG. 13, the linking circuitry 610 renders the line item control panel 1302 and a line item adder icon 1304 to invoke interactive line selectors, as shown in FIG. 14. In response to selection and/or otherwise activating the example line item adder icon 1304, the example linking circuitry 610 renders an example interactive line selector 1402, as shown in FIG. 14. The interactive line selector 1402 may be dragged and/or otherwise placed in a horizontal orientation to intersect with any number of text boxes that are to be linked together. For instance, the example interactive line selector 1402 of FIG. 14 intersects all the text boxes of the example first row 1214. The example linking circuitry 610 causes the information corresponding to the intersected text boxes to be rendered in the example line item control panel 1302 as linked data corresponding to an item 1404. Additionally, in response to the example linking circuitry 610 detecting selection of a new line icon 1406, another interactive line selector 1408 is rendered so that the linked data corresponding to an item 1404 can be appended with additional text box information corresponding to the product. In particular, the linking circuitry 610 appends the text box content of the example second row 1216 as "1/0 125.50 0.00 $125.50". As such, text box information corresponding to a single product is linked despite the fact that such product information spans more than a single horizontal line on the example image of the invoice.

Figure 15:
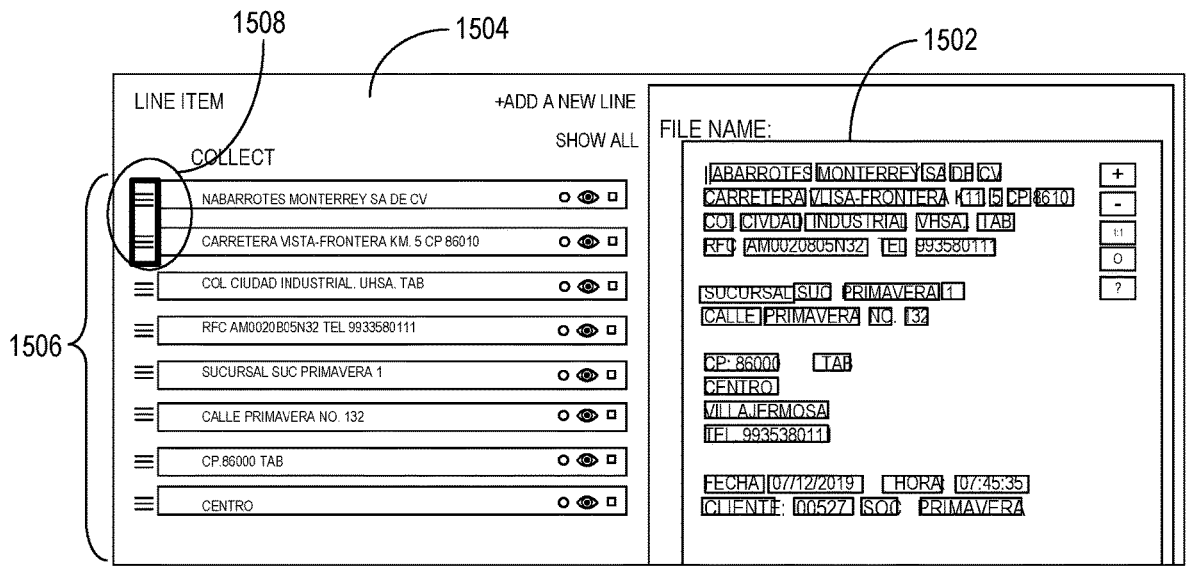
FIG. 15 illustrates a portion of a captured image that includes address information.

The example linking circuitry 610 also facilitates re-ordering of text box data that has been extracted via one or more OCR services. FIG. 15 illustrates a portion of a captured image 1502 (e.g., a receipt having address information thereon) and a line item control panel 1504. In the illustrated example of FIG. 15, the linking circuitry 610 renders lines of linked text box information 1506 in an order as shown on the corresponding captured image 1502. In the event one or more lines of linked text box information 1506 is to be re-ordered, the example linking circuitry 610 renders a re-order tool 1508 to permit each line of linked text box information 1506 to be placed in an alternate ordered sequence.

Figure 16:
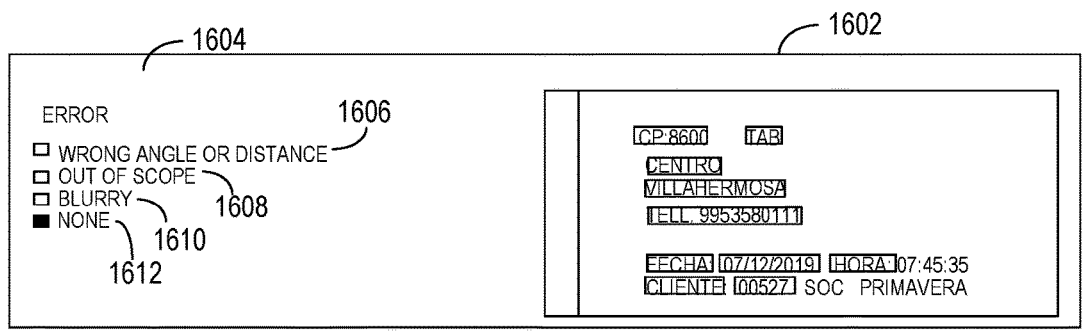
FIG. 16 illustrates the portion of the captured image of FIG. 15 and an example meta information control panel generated by examples disclosed herein to label images having text information.

The example metadata management circuitry 612 facilitates adding meta information to captured images. FIG. 16 illustrates a portion of a captured image 1602 (e.g., a receipt) and a meta information control panel 1604. Generally speaking, original documents from which the captured image 1602 is derived may exhibit particular artifacts that cause errors in one or more OCR services. In some examples, the machine learning interface circuitry 614 applies one or more AI/ML techniques that utilize artifact information in an effort to calculate confidence scores for obtained OCR data. As such, examples disclosed herein enable labelling captured images with meta information. In the illustrated example of FIG. 16, the linking circuitry 610 renders selection icons indicative of different artifacts, including, but not limited to an indication that the captured image exhibits a wrong angle or distance (e.g., skew) 1606, an indication that the captured image exhibits an "out of scope" condition 1608, an indication that the captured image exhibits blurriness 1610, or an indication that the captured image shows no particular artifact(s) 1612. While the illustrated example of FIG. 16 shows four example artifacts, examples disclosed herein are not limited thereto. Upon completion or during the process of labeling the example captured image, such labeled data may be stored in any storage device, such as the example image data source 506 of FIG. 5.

Returning to the illustrated example of FIGS. 5 and 6, in some examples, the label circuitry 508, the image retriever circuitry 602, the OCR manager circuitry 604, the colorizer circuitry 606, the edit circuitry 608, the linking circuitry 610, the metadata management circuitry 612, and the machine learning interface circuitry 614 includes, respectively, means for labelling circuitry, means for retrieving images, means for managing OCR, means for colorizing, means for editing, means for linking, means for managing metadata, and means for interfacing machine learning. For example, the means for labelling circuitry may be implemented by the example label circuitry 508, the means for retrieving images may be implemented by the example image retriever circuitry 602, the means for managing OCR may be implemented by the example OCR manager circuitry 604, the means for colorizing may be implemented by the example colorizer circuitry 606, the means for editing may be implemented by the example edit circuitry 608, the means for linking may be implemented by the example linking circuitry 610, the means for managing metadata may be implemented by the example metadata management circuitry 612, and the means for interfacing machine learning may be implemented by the example machine learning interface circuitry 614. In some examples, the label circuitry 508, the image retriever circuitry 602, the OCR manager circuitry 604, the colorizer circuitry 606, the edit circuitry 608, the linking circuitry 610, the metadata management circuitry 612, and the machine learning interface circuitry 614 may be instantiated by processor circuitry such as the example processor circuitry 2212 of FIG. 22. For instance, the aforementioned circuitry may be instantiated by the example general purpose processor circuitry 2300 of FIG. 23 executing machine executable instructions such as that implemented by at least the example blocks shown in FIGS. 17-21. In some examples, the aforementioned circuitry may be instantiated by hardware logic circuitry, which may be implemented by an ASIC or the FPGA circuitry 2400 of FIG. 24 structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example label circuitry 508 of FIG. 5 is illustrated in FIGS. 5 and 6, one or more of the elements, processes, and/or devices illustrated in FIGS. 5 and 6 may be combined, divided, re-arranged, omitted, eliminated, and/or implemented in any other way. Further, the example image retriever circuitry 602, the example OCR manager circuitry 604, the example colorizer circuitry 606, the example edit circuitry 608, the example linking circuitry 610, the example metadata management circuitry 612, the example machine learning interface circuitry 614 and/or, more generally, the example label circuitry 508 of FIGS. 5 and 6, may be implemented by hardware alone or by hardware in combination with software and/or firmware. Thus, for example, any of the example image retriever circuitry 602, the example OCR manager circuitry 604, the example colorizer circuitry 606, the example edit circuitry 608, the example linking circuitry 610, the example metadata management circuitry 612, the example machine learning interface circuitry 614 and/or, more generally, the example label circuitry 508 of FIGS. 5 and 6 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example label circuitry 508 of FIGS. 5 and 6 may include one or more elements, processes, and/or devices in addition to, or instead of, those illustrated in FIGS. 5 and 6, and/or may include more than one of any or all of the illustrated elements, processes and devices.

Flowcharts representative of example hardware logic circuitry, machine readable instructions, hardware implemented state machines, and/or any combination thereof for implementing the example label circuitry 508 of FIGS. 5 and 6 are shown in FIGS. 17-21. The machine readable instructions may be one or more executable programs or portion(s) of an executable program for execution by processor circuitry, such as the processor circuitry 2212 shown in the example processor platform 2200 discussed below in connection with FIG. 22 and/or the example processor circuitry discussed below in connection with FIGS. 23 and/or 24. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) is/are described with reference to the flowcharts illustrated in FIGS. 17-21, many other methods of implementing the example label circuitry 508 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 17-21 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 17:
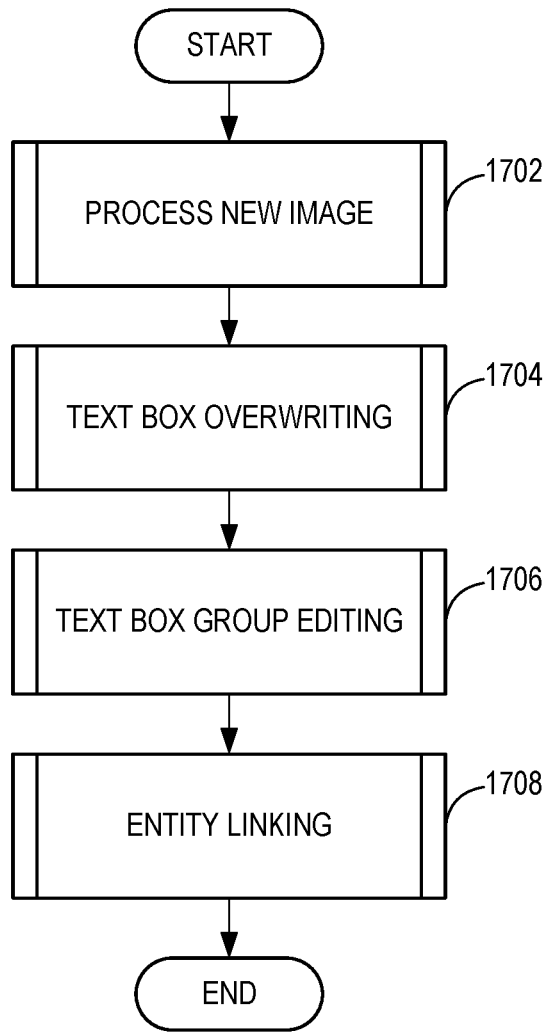
FIGS. 17-21 are flowcharts representative of example machine readable instructions and/or example operations that may be executed by example processor circuitry to implement the example label system of FIGS. 5 and/or 6.

FIG. 17 is a flowchart representative of example machine readable instructions and/or example operations 1700 that may be executed and/or instantiated by processor circuitry to label text on images. The machine readable instructions and/or the operations 1700 of FIG. 17 begin at block 1702, at which the image retriever circuitry 602 processes a new image, as described above and in further detail below in connection with FIG. 18. The example OCR manager circuitry 604 performs text box overwriting (block 1704) and described above and in further detail below in connection with FIG. 19. The example edit circuitry 608 performs text box editing (block 1706) as described above and in further detail below in connection with FIG. 20. The example linking circuitry 610 performs entity linking (block 1708) as described above and in further detail below in connection with FIG. 21.

Figure 18:
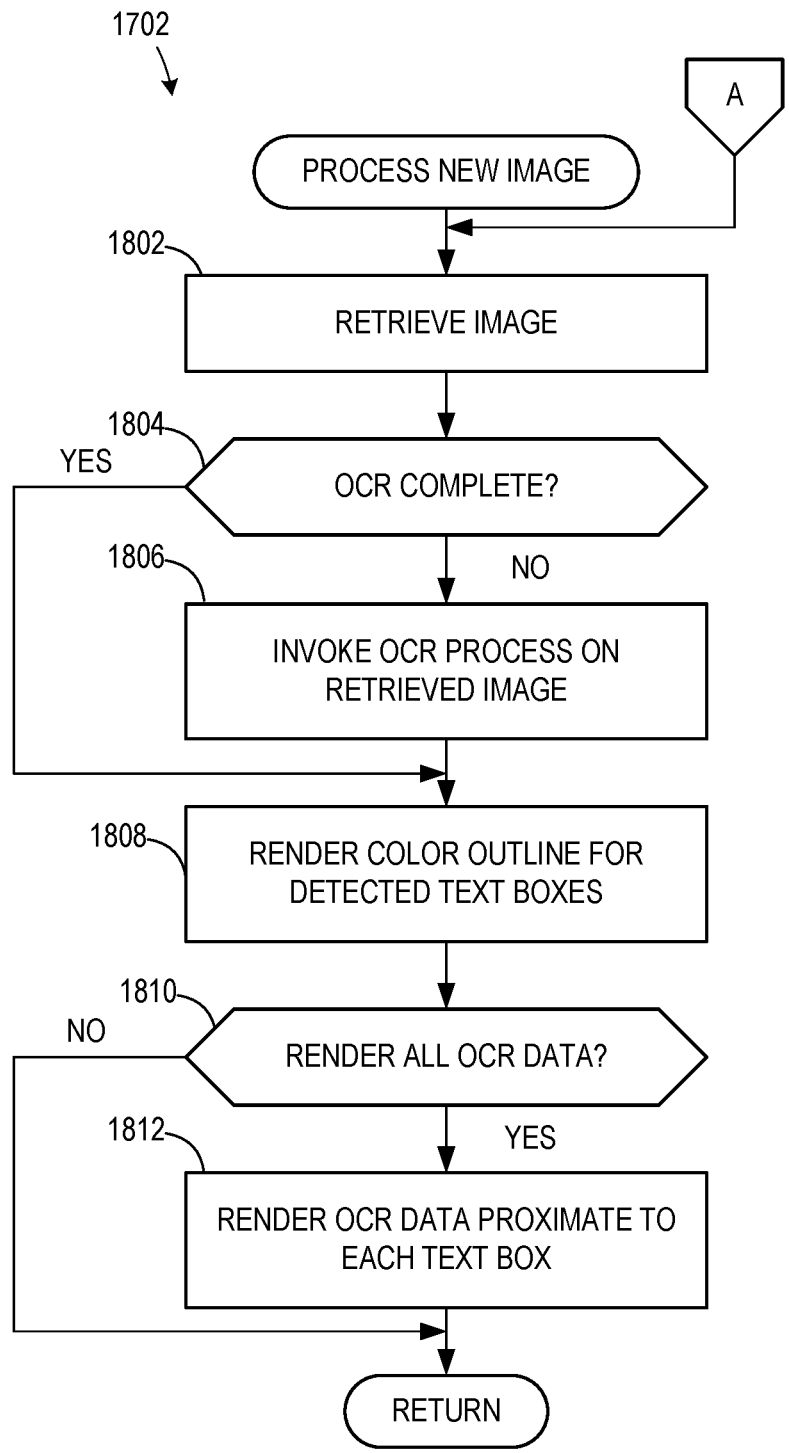

FIG. 18 illustrates additional detail corresponding to block 1702 of FIG. 17 to process a new image. In the illustrated example of FIG. 18, the image retriever circuitry 602 retrieves, receives and/or otherwise obtains an image of interest (block 1802), such as a previously captured image from the example image data source 506. The example OCR manager circuitry 604 determines whether the retrieved image has been processed in view of one or more OCR services (block 1804) and, if not, the OCR manager circuitry 604 invokes an OCR service/process to identify text on the retrieved image (block 1806).

The example colorizer circuitry 606 renders a color outline around at least one text box (block 1808) generated as a result of the one or more OCR services. In some examples, the colorizer circuitry 606 renders a random color for the at least one text box in response to an indication of selection, such as in response to a mouse pointer hovering over the text box, or in response to a selection via a mouse click or digitizer pen input. Alternatively, text box colorization may be based on a particular length of extracted characters, such as an example first color for text boxes that have detected a single character, an example second color for text boxes that have detected two characters, an example third color for text boxes that have detected three characters, and so on. As described above, the example image retriever circuitry 602 may include one or more servers to generate a GUI that permits interaction with the image of interest, such as interactions from users that are chartered with the responsibility of labelling images for future use in AI/ML applications to identify text.

In some instances, examples disclosed herein enable a convenient view of text corresponding to all text boxes generated and/or otherwise detected by the one or more OCR services without further manipulation and/or selection of the GUI on which the image is rendered. In particular, rather than respond to individual text box selections to determine and/or otherwise view/evaluate the text extracted via OCR services, the example OCR manager circuitry 604 determines whether all text box data should be rendered (block 1810) and, if so, renders the detected text adjacent to each text box of the entire image of interest (block 1812). As such, label personnel can quickly review the entire page for text that may not have been accurately extracted via the OCR services (e.g., the image includes the word "the" but the OCR services erroneously extracted "th3"). Control then advances to block 1704 of FIG. 17.

Figure 19:
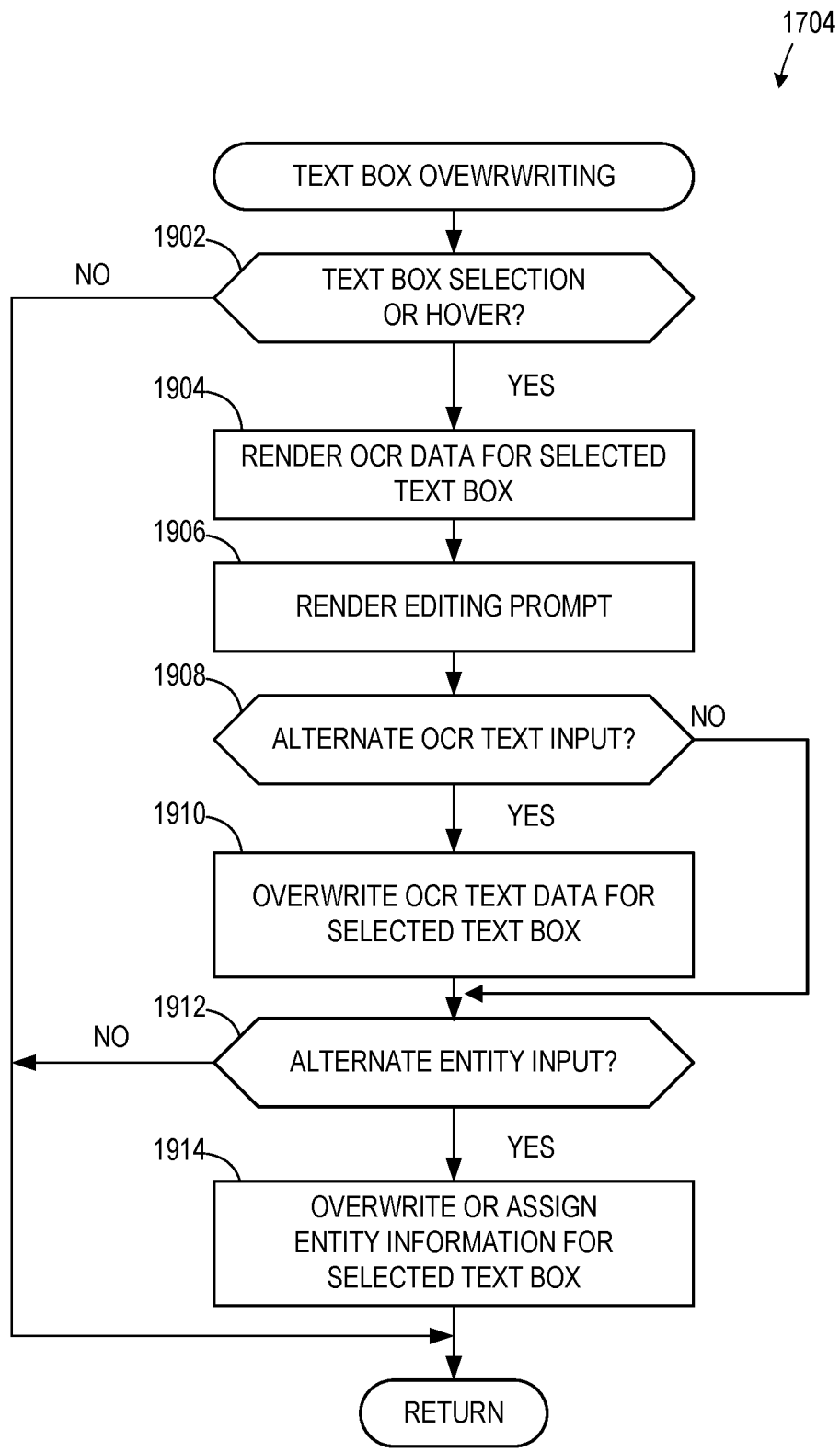

FIG. 19 illustrates additional detail corresponding to block 1704 of FIG. 17. In the illustrated example of FIG. 19, the example OCR manager circuitry 604 determines whether one of the text boxes of the image is selected (block 1902), such as by way of mouse pointer hovering, mouse pointer clicking, selection/hovering via a digitizer pen, selection via a touch screen, etc. If not, then control advances to block 1706 of FIG. 17. On the other hand, in response to such a selection the example OCR manager circuitry 604 renders OCR data adjacent to the selected text box (block 1904) in a manner described above in view of FIG. 9 (e.g., see the example text box 906 and the example adjacently located editing interface 904 and OCR text 908).

The example editing circuitry 608 renders the example editing interface 904 (e.g., sometimes referred to herein as an editing prompt) (block 1906) and determines whether alternate text is to be overwritten and/or otherwise recorded (block 1908). As described above, in the event the OCR services erroneously interpreted the image text as "th3" instead of the word "the," then the example editing circuitry 608 permits alternate text entry to correct such mistakes (block 1910). The example editing interface 904 rendered by the example editing circuitry 608 (e.g., via a GUI, web server, etc.) includes example entity information associated with the example text box, as shown in FIG. 9. In particular, the selected text box 906 may be associated with particular entity information such as, but not limited to product quantity, product code, product total, product description, product price, etc. Stated differently, each text box may be designated as a particular type of entity by selecting entity information when the example text box 906 is selected (block 1912). In response to such an entity selection (block 1912), the example edit circuitry 608 overwrites or assigns the selected entity information to the selected text box (block 1914). Control then advances to block 1706 of FIG. 17.

Figure 20:
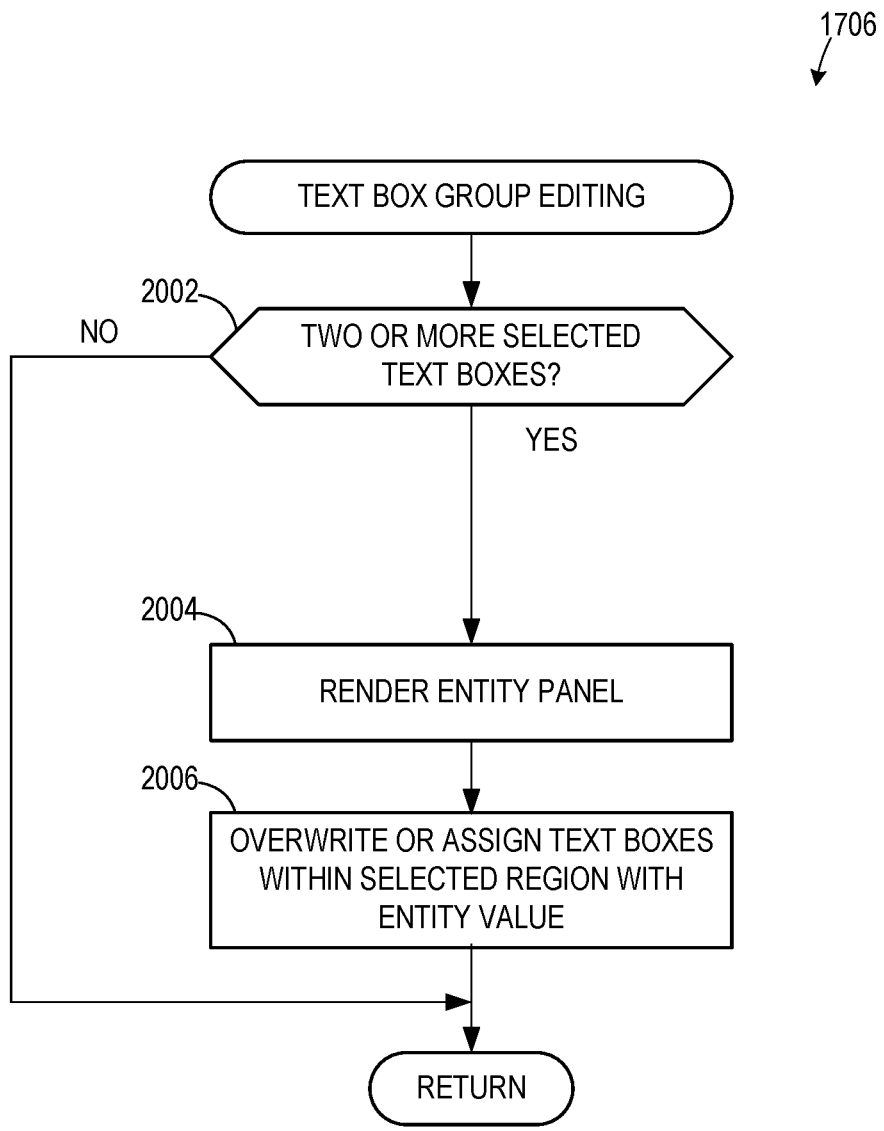

FIG. 20 illustrates additional detail associated with block 1706 to facilitate text box group editing. In the illustrated example of FIG. 20, the example edit circuitry 608 determines whether two or more text boxes are selected (block 2002). For example, a user may use a mouse pointer via click-and-drag action to select a region of a label presented in a GUI. When the example edit circuitry 608 determines that two or more text boxes are selected (block 2002) as shown in FIG. 11, then it renders the example entity panel 1102 (block 2004). As discussed above in connection with FIG. 11, after a selection of two or more text boxes, and after a selection of entity information (e.g., product code 1106), the example edit circuitry 608 associates those selected text boxes with the corresponding entity information (block 2006). Accordingly, it is not necessary for each text box to be selected on a one-by-one basis when associating it with entity information, thereby facilitating a more efficient manner of image labeling. Control then advances to block 1708 of FIG. 17.

Figure 21:
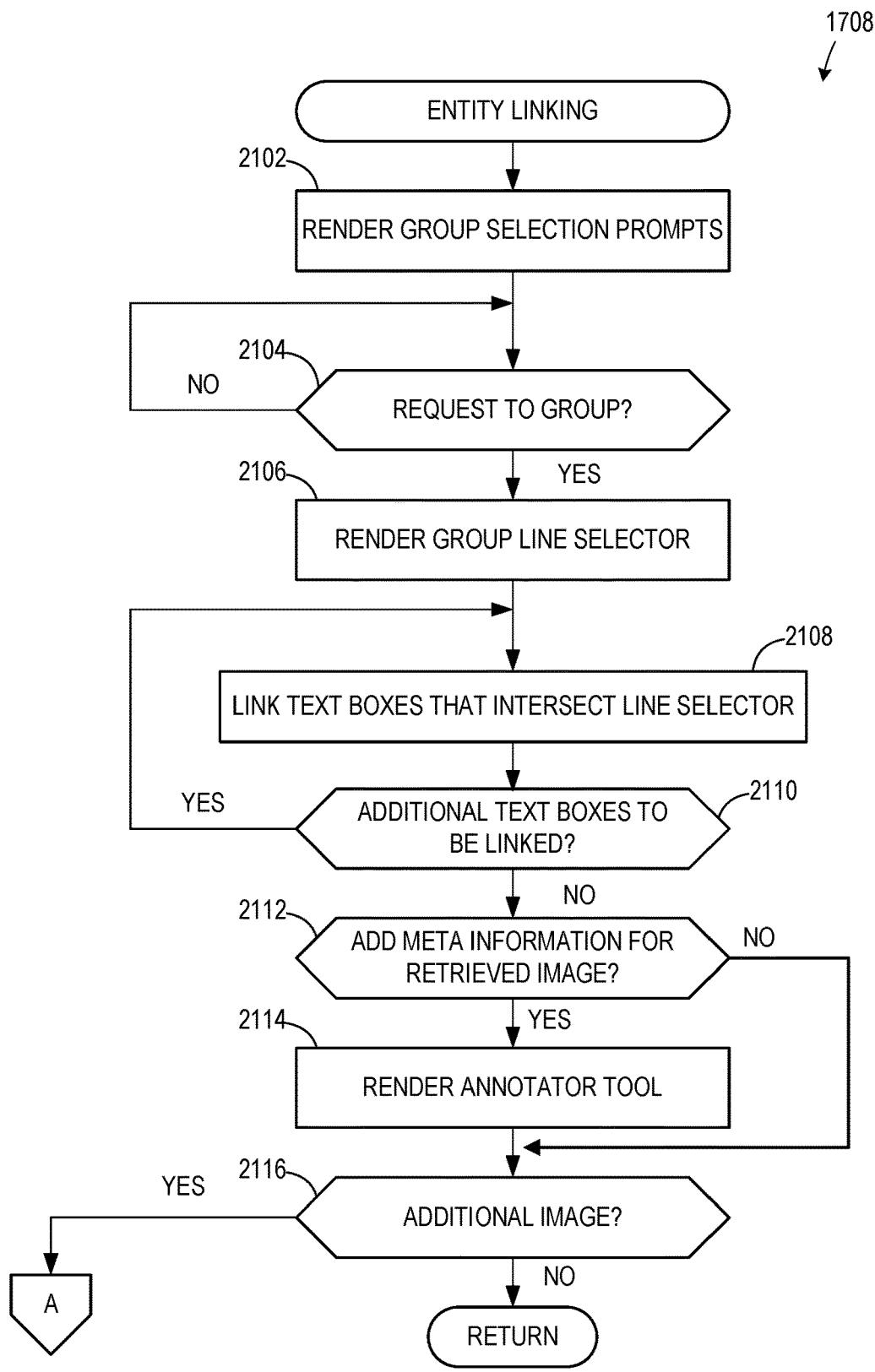

FIG. 21 illustrates additional detail associated with block 1708 of FIG. 17 to link text boxes that are to be associated with a same product or service of the captured image. As described above, two or more text boxes, when considered in the aggregate, contain information that reveals relevant details for a product or service that is listed on the captured image (e.g., an image of an invoice, an image of a store receipt, etc.). For example, a text box containing a product code combined with a text box containing a product quantity combined with a text box containing a product description combined with a text box containing a product quantity combined with a text box containing a total price are, in the aggregate, related text boxes for a single product. Examples disclosed herein enable such groupings of text boxes to be linked together, which is particularly important when the captured image is wrinkled and/or otherwise has poor quality. Additionally, because products and/or items on receipts may appear in one or more (multiple) lines, examples disclosed herein enable grouping all such information together to identify a single group or entity.

The example linking circuitry 610 renders a line item control panel 1302, as discussed above in connection with FIG. 13 (block 2102). In response to the linking circuitry 610 detecting a request to group (block 2104) (e.g., by detecting selection of the line item adder icon 1304), it renders a group line selector 1402 (block 2106). The example linking circuitry 610 links the two or more text boxes that intersect the group line selector 1402 (block 2108) and adds the information from those intersecting text boxes to the item 1404 (e.g., the item common to all the text boxes by virtue of their intersection). Additionally, the linking circuitry 610 determines whether one or more additional text boxes are to be linked to the recently linked grouping (block 2110) (e.g., by detecting selection of the example new line icon 1406).

Additionally, the example metadata management circuitry 612 determines whether to add metadata information to the image (block 2112). If so, the example metadata management circuitry 612 renders the example meta information control panel 1604 (block 2114) as described above in connection with FIG. 16. The image is then associated with and/or otherwise the metadata information is embedded in the image of interest that corresponds to one or more pieces of metadata information (e.g., a designation that the image is blurry, a designation that the image is at a wrong angle (e.g., skewed), etc.). The example image retriever circuitry 602 determines whether one or more additional images is to be evaluated (block 2116). If not, the example program ends, otherwise control returns to block 1802 of FIG. 18.

Figure 22:
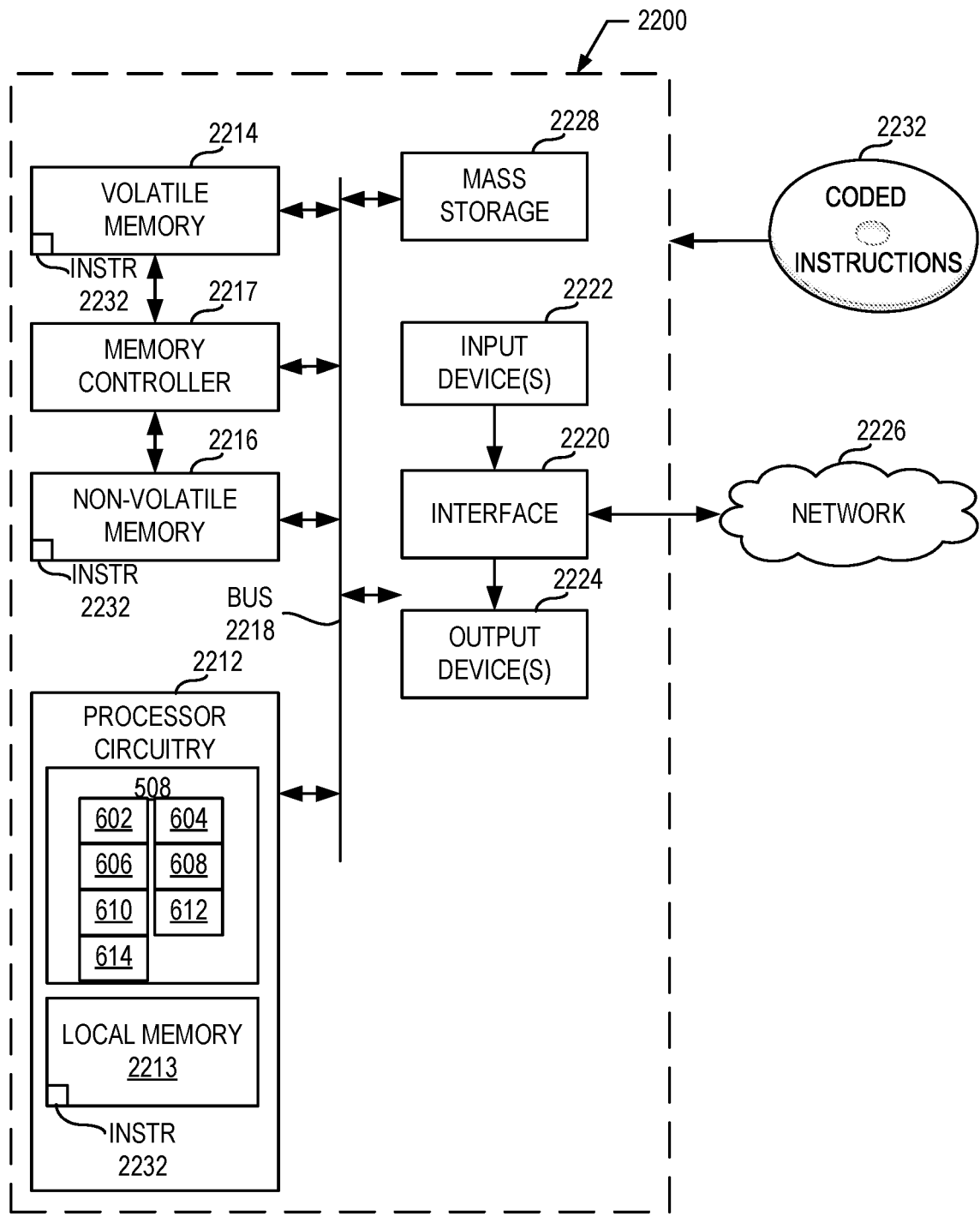
FIG. 22 is a block diagram of an example processor platform including processor circuitry structured to execute the example machine readable instructions and/or the example operations of FIGS. 17-21 to implement the label system of FIGS. 5 and/or 6.

FIG. 22 is a block diagram of an example processor platform 2200 structured to execute and/or instantiate the machine readable instructions and/or the operations of FIGS. 17-21 to implement the example label circuitry 508 of FIGS. 5 and 6. The processor platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset (e.g., an augmented reality (AR) headset, a virtual reality (VR) headset, etc.) or other wearable device, or any other type of computing device.

The processor platform 2200 of the illustrated example includes processor circuitry 2212. The processor circuitry 2212 of the illustrated example is hardware. For example, the processor circuitry 2212 can be implemented by one or more integrated circuits, logic circuits, FPGAs, microprocessors, CPUs, GPUs, DSPs, and/or microcontrollers from any desired family or manufacturer. The processor circuitry 2212 may be implemented by one or more semiconductor based (e.g., silicon based) devices. In this example, the processor circuitry 2212 implements the example image retriever circuitry 602, the example OCR manager circuitry 604, the example colorizer circuitry 606, the example edit circuitry 608, the example linking circuitry 610, the example metadata management circuitry 612, the example machine learning interface circuitry 614 and/or, more generally, the example label circuitry 508.

The processor circuitry 2212 of the illustrated example includes a local memory 2213 (e.g., a cache, registers, etc.). The processor circuitry 2212 of the illustrated example is in communication with a main memory including a volatile memory 2214 and a non-volatile memory 2216 by a bus 2218. The volatile memory 2214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2216 may be implemented by flash memory and/or any other desired type of memory device. Access to the main memory 2214, 2216 of the illustrated example is controlled by a memory controller 2217.

The processor platform 2200 of the illustrated example also includes interface circuitry 2220. The interface circuitry 2220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2222 are connected to the interface circuitry 2220. The input device(s) 2222 permit(s) a user to enter data and/or commands into the processor circuitry 2212. The input device(s) 2222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2224 are also connected to the interface circuitry 2220 of the illustrated example. The output device(s) 2224 can be implemented, for example, by display devices (e.g., a light emitting diode (LED), an organic light emitting diode (OLED), a liquid crystal display (LCD), a cathode ray tube (CRT) display, an in-place switching (IPS) display, and/or a touchscreen, etc.). The interface circuitry 2220 of the illustrated example, thus, typically includes a graphics driver card, a graphics driver chip, and/or graphics processor circuitry such as a GPU.

The interface circuitry 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2200 of the illustrated example also includes one or more mass storage devices 2228 to store software and/or data. Examples of such mass storage devices 2228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 2232, which may be implemented by the machine readable instructions of FIGS. 17-21, may be stored in the mass storage device 2228, in the volatile memory 2214, in the non-volatile memory 2216, and/or on a removable non-transitory computer readable storage medium such as a CD or DVD.

Figure 23:
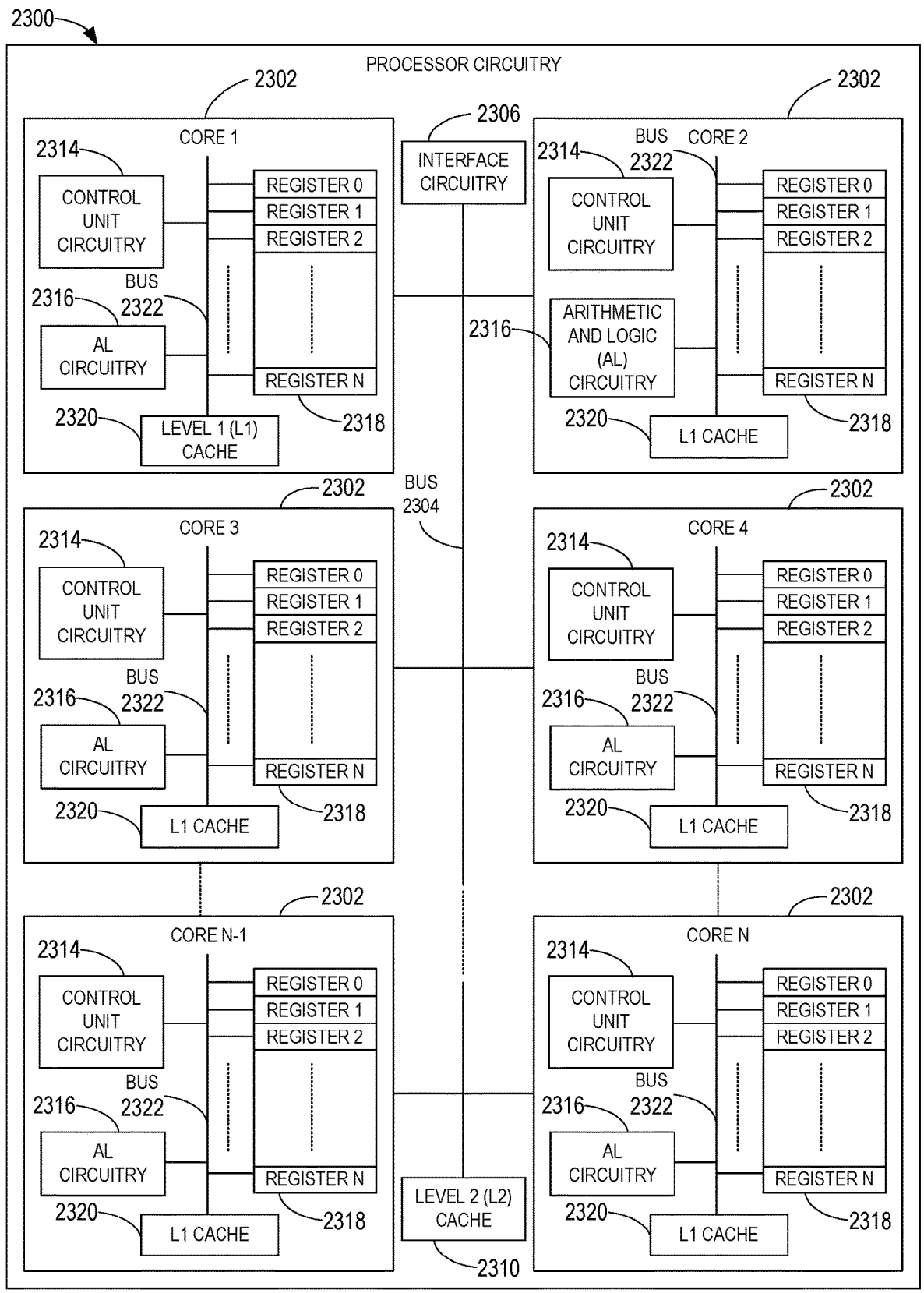
FIG. 23 is a block diagram of an example implementation of the processor circuitry of FIG. 22.

FIG. 23 is a block diagram of an example implementation of the processor circuitry 2212 of FIG. 22. In this example, the processor circuitry 2212 of FIG. 22 is implemented by a general purpose microprocessor 2300. The general purpose microprocessor circuitry 2300 executes some or all of the machine readable instructions of the flowcharts of FIGS. 17-21 to effectively instantiate the circuitry of FIGS. 5 and/or 6 as logic circuits to perform the operations corresponding to those machine readable instructions. In some such examples, the circuitry of FIGS. 5 and/or 6 is instantiated by the hardware circuits of the microprocessor 2300 in combination with the instructions. For example, the microprocessor 2300 may implement multi-core hardware circuitry such as a CPU, a DSP, a GPU, an XPU, etc. Although it may include any number of example cores 2302 (e.g., 1 core), the microprocessor 2300 of this example is a multi-core semiconductor device including N cores. The cores 2302 of the microprocessor 2300 may operate independently or may cooperate to execute machine readable instructions. For example, machine code corresponding to a firmware program, an embedded software program, or a software program may be executed by one of the cores 2302 or may be executed by multiple ones of the cores 2302 at the same or different times. In some examples, the machine code corresponding to the firmware program, the embedded software program, or the software program is split into threads and executed in parallel by two or more of the cores 2302. The software program may correspond to a portion or all of the machine readable instructions and/or operations represented by the flowcharts of FIGS. 17-21.

The cores 2302 may communicate by a first example bus 2304. In some examples, the first bus 2304 may implement a communication bus to effectuate communication associated with one(s) of the cores 2302. For example, the first bus 2304 may implement at least one of an Inter-Integrated Circuit (I2C) bus, a Serial Peripheral Interface (SPI) bus, a PCI bus, or a PCIe bus. Additionally or alternatively, the first bus 2304 may implement any other type of computing or electrical bus. The cores 2302 may obtain data, instructions, and/or signals from one or more external devices by example interface circuitry 2306. The cores 2302 may output data, instructions, and/or signals to the one or more external devices by the interface circuitry 2306. Although the cores 2302 of this example include example local memory 2320 (e.g., Level 1 (L1) cache that may be split into an L1 data cache and an L1 instruction cache), the microprocessor 2300 also includes example shared memory 2310 that may be shared by the cores (e.g., Level 2 (L2_cache)) for high-speed access to data and/or instructions. Data and/or instructions may be transferred (e.g., shared) by writing to and/or reading from the shared memory 2310. The local memory 2320 of each of the cores 2302 and the shared memory 2310 may be part of a hierarchy of storage devices including multiple levels of cache memory and the main memory (e.g., the main memory 2214, 2216 of FIG. 22). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2302 may be referred to as a CPU, DSP, GPU, etc., or any other type of hardware circuitry. Each core 2302 includes control unit circuitry 2314, arithmetic and logic (AL) circuitry (sometimes referred to as an ALU) 2316, a plurality of registers 2318, the L1 cache 2320, and a second example bus 2322. Other structures may be present. For example, each core 2302 may include vector unit circuitry, single instruction multiple data (SIMD) unit circuitry, load/store unit (LSU) circuitry, branch/jump unit circuitry, floating-point unit (FPU) circuitry, etc. The control unit circuitry 2314 includes semiconductor-based circuits structured to control (e.g., coordinate) data movement within the corresponding core 2302. The AL circuitry 2316 includes semiconductor-based circuits structured to perform one or more mathematic and/or logic operations on the data within the corresponding core 2302. The AL circuitry 2316 of some examples performs integer based operations. In other examples, the AL circuitry 2316 also performs floating point operations. In yet other examples, the AL circuitry 2316 may include first AL circuitry that performs integer based operations and second AL circuitry that performs floating point operations. In some examples, the AL circuitry 2316 may be referred to as an Arithmetic Logic Unit (ALU). The registers 2318 are semiconductor-based structures to store data and/or instructions such as results of one or more of the operations performed by the AL circuitry 2316 of the corresponding core 2302. For example, the registers 2318 may include vector register(s), SIMD register(s), general purpose register(s), flag register(s), segment register(s), machine specific register(s), instruction pointer register(s), control register(s), debug register(s), memory management register(s), machine check register(s), etc. The registers 2318 may be arranged in a bank as shown in FIG. 23. Alternatively, the registers 2318 may be organized in any other arrangement, format, or structure including distributed throughout the core 2302 to shorten access time. The second bus 2322 may implement at least one of an I2C bus, a SPI bus, a PCI bus, or a PCIe bus Each core 2302 and/or, more generally, the microprocessor 2300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 24:
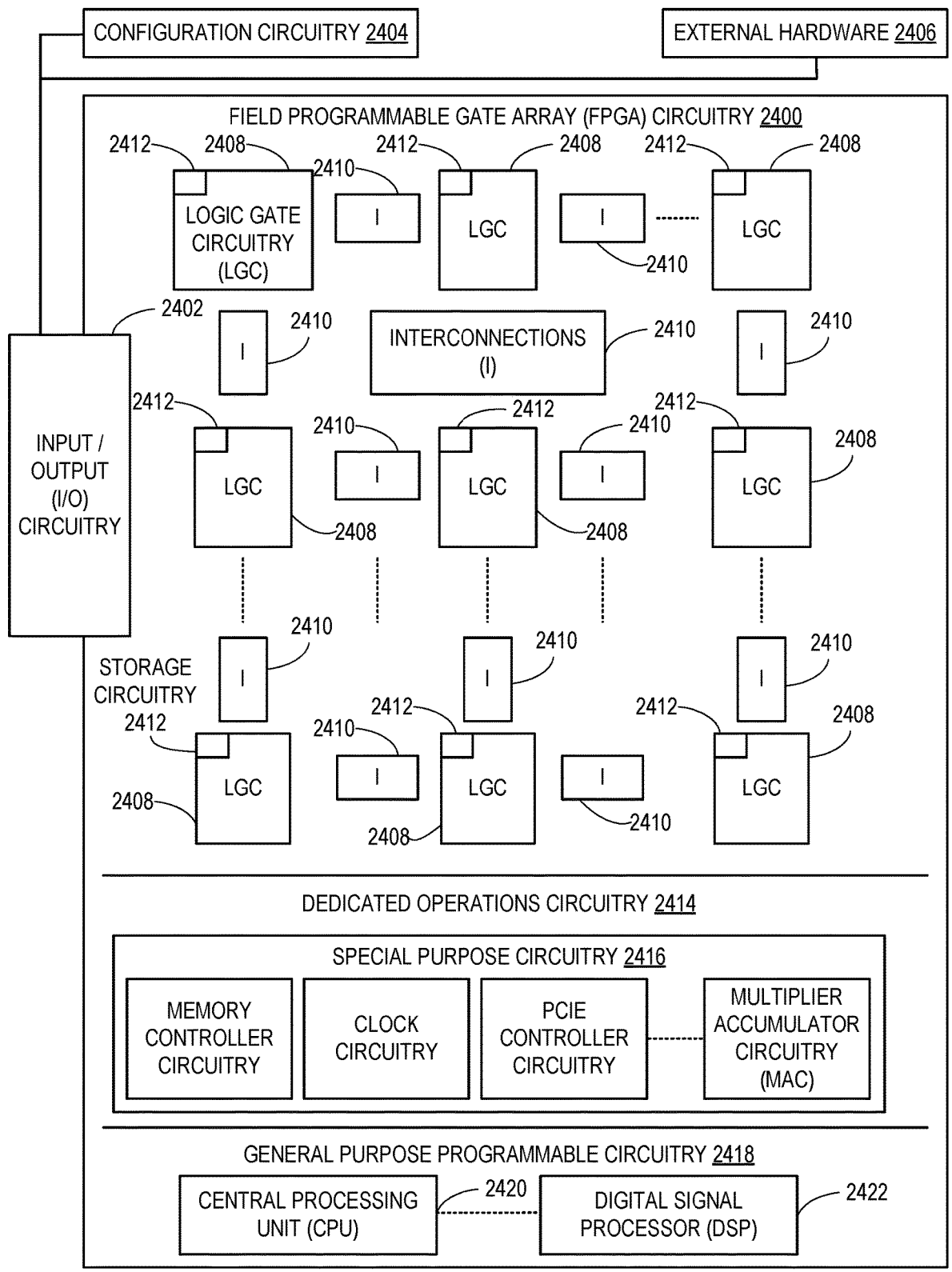
FIG. 24 is a block diagram of another example implementation of the processor circuitry of FIG. 22.

FIG. 24 is a block diagram of another example implementation of the processor circuitry 2212 of FIG. 22. In this example, the processor circuitry 2212 is implemented by FPGA circuitry 2400. The FPGA circuitry 2400 can be used, for example, to perform operations that could otherwise be performed by the example microprocessor 2300 of FIG. 23 executing corresponding machine readable instructions. However, once configured, the FPGA circuitry 2400 instantiates the machine readable instructions in hardware and, thus, can often execute the operations faster than they could be performed by a general purpose microprocessor executing the corresponding software.

More specifically, in contrast to the microprocessor 2300 of FIG. 23 described above (which is a general purpose device that may be programmed to execute some or all of the machine readable instructions represented by the flowcharts of FIGS. 17-21 but whose interconnections and logic circuitry are fixed once fabricated), the FPGA circuitry 2400 of the example of FIG. 24 includes interconnections and logic circuitry that may be configured and/or interconnected in different ways after fabrication to instantiate, for example, some or all of the machine readable instructions represented by the flowcharts of FIGS. 17-21. In particular, the FPGA 2400 may be thought of as an array of logic gates, interconnections, and switches. The switches can be programmed to change how the logic gates are interconnected by the interconnections, effectively forming one or more dedicated logic circuits (unless and until the FPGA circuitry 2400 is reprogrammed). The configured logic circuits enable the logic gates to cooperate in different ways to perform different operations on data received by input circuitry. Those operations may correspond to some or all of the software represented by the flowcharts of FIGS. 17-21. As such, the FPGA circuitry 2400 may be structured to effectively instantiate some or all of the machine readable instructions of the flowcharts of FIGS. 17-21 as dedicated logic circuits to perform the operations corresponding to those software instructions in a dedicated manner analogous to an ASIC. Therefore, the FPGA circuitry 2400 may perform the operations corresponding to the some or all of the machine readable instructions of FIGS. 17-21 faster than the general purpose microprocessor can execute the same.

In the example of FIG. 24, the FPGA circuitry 2400 is structured to be programmed (and/or reprogrammed one or more times) by an end user by a hardware description language (HDL) such as Verilog. The FPGA circuitry 2400 of FIG. 24, includes example input/output (I/O) circuitry 2402 to obtain and/or output data to/from example configuration circuitry 2404 and/or external hardware (e.g., external hardware circuitry) 2406. For example, the configuration circuitry 2404 may implement interface circuitry that may obtain machine readable instructions to configure the FPGA circuitry 2400, or portion(s) thereof. In some such examples, the configuration circuitry 2404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2406 may implement the microprocessor 2300 of FIG. 23. The FPGA circuitry 2400 also includes an array of example logic gate circuitry 2408, a plurality of example configurable interconnections 2410, and example storage circuitry 2412. The logic gate circuitry 2408 and interconnections 2410 are configurable to instantiate one or more operations that may correspond to at least some of the machine readable instructions of FIGS. 17-21 and/or other desired operations. The logic gate circuitry 2408 shown in FIG. 24 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2408 to enable configuration of the electrical structures and/or the logic gates to form circuits to perform desired operations. The logic gate circuitry 2408 may include other electrical structures such as look-up tables (LUTs), registers (e.g., flip-flops or latches), multiplexers, etc.

The interconnections 2410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2408 to program desired logic circuits.

The storage circuitry 2412 of the illustrated example is structured to store result(s) of the one or more of the operations performed by corresponding logic gates. The storage circuitry 2412 may be implemented by registers or the like. In the illustrated example, the storage circuitry 2412 is distributed amongst the logic gate circuitry 2408 to facilitate access and increase execution speed.

The example FPGA circuitry 2400 of FIG. 24 also includes example Dedicated Operations Circuitry 2414. In this example, the Dedicated Operations Circuitry 2414 includes special purpose circuitry 2416 that may be invoked to implement commonly used functions to avoid the need to program those functions in the field. Examples of such special purpose circuitry 2416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2400 may also include example general purpose programmable circuitry 2418 such as an example CPU 2420 and/or an example DSP 2422. Other general purpose programmable circuitry 2418 may additionally or alternatively be present such as a GPU, an XPU, etc., that can be programmed to perform other operations.

Although FIGS. 23 and 24 illustrate two example implementations of the processor circuitry 2212 of FIG. 22, many other approaches are contemplated. For example, as mentioned above, modern FPGA circuitry may include an on-board CPU, such as one or more of the example CPU 2420 of FIG. 24. Therefore, the processor circuitry 2212 of FIG. 22 may additionally be implemented by combining the example microprocessor 2300 of FIG. 23 and the example FPGA circuitry 2400 of FIG. 24. In some such hybrid examples, a first portion of the machine readable instructions represented by the flowcharts of FIGS. 17-21 may be executed by one or more of the cores 2302 of FIG. 23, a second portion of the machine readable instructions represented by the flowcharts of FIGS. 17-21 may be executed by the FPGA circuitry 2400 of FIG. 24, and/or a third portion of the machine readable instructions represented by the flowcharts of FIGS. 17-21 may be executed by an ASIC. It should be understood that some or all of the circuitry of FIGS. 5 and/or 6 may, thus, be instantiated at the same or different times. Some or all of the circuitry may be instantiated, for example, in one or more threads executing concurrently and/or in series. Moreover, in some examples, some or all of the circuitry of FIGS. 5 and/or 6 may be implemented within one or more virtual machines and/or containers executing on the microprocessor.

In some examples, the processor circuitry 2212 of FIG. 22 may be in one or more packages. For example, the processor circuitry 2300 of FIG. 23 and/or the FPGA circuitry 2400 of FIG. 24 may be in one or more packages. In some examples, an XPU may be implemented by the processor circuitry 2212 of FIG. 22, which may be in one or more packages. For example, the XPU may include a CPU in one package, a DSP in another package, a GPU in yet another package, and an FPGA in still yet another package.

Figure 25:
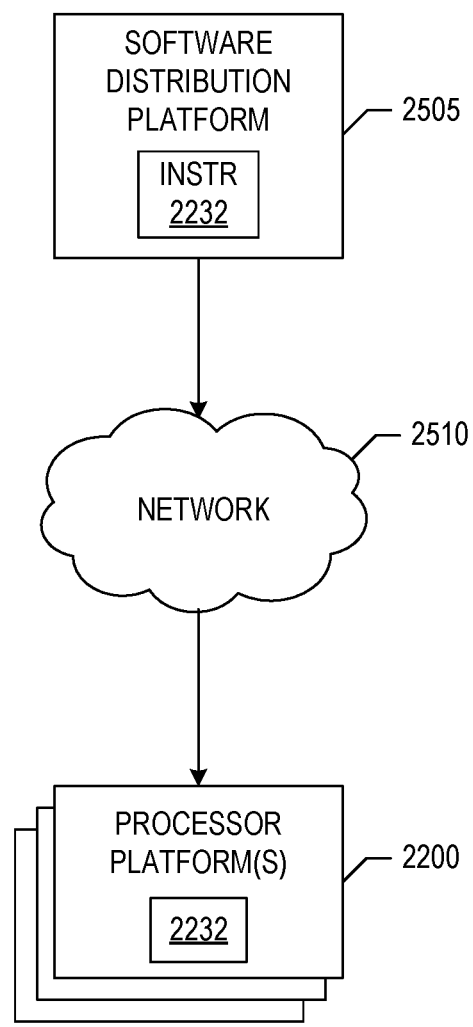
FIG. 25 is a block diagram of an example software distribution platform (e.g., one or more servers) to distribute software (e.g., software corresponding to the example machine readable instructions of FIGS. 17-21) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2505 to distribute software such as the example machine readable instructions 2232 of FIG. 23 to hardware devices owned and/or operated by third parties is illustrated in FIG. 25. The example software distribution platform 2505 may be implemented by any computer server, data facility, cloud service, etc., capable of storing and transmitting software to other computing devices. The third parties may be customers of the entity owning and/or operating the software distribution platform 2505. For example, the entity that owns and/or operates the software distribution platform 2505 may be a developer, a seller, and/or a licensor of software such as the example machine readable instructions 2232 of FIG. 22. The third parties may be consumers, users, retailers, OEMs, etc., who purchase and/or license the software for use and/or re-sale and/or sub-licensing. In the illustrated example, the software distribution platform 2505 includes one or more servers and one or more storage devices. The storage devices store the machine readable instructions 2232, which may correspond to the example machine readable instructions of FIGS. 17-21, as described above. The one or more servers of the example software distribution platform 2505 are in communication with a network 2510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2232 from the software distribution platform 2505. For example, the software, which may correspond to the example machine readable instructions of FIGS. 17-21, may be downloaded to the example processor platform 2200, which is to execute the machine readable instructions 2232 to implement the structure disclosed herein. In some example, one or more servers of the software distribution platform 2505 periodically offer, transmit, and/or force updates to the software (e.g., the example machine readable instructions 2232 of FIG. 22) to ensure improvements, patches, updates, etc., are distributed and applied to the software at the end user devices.

From the foregoing, it will be appreciated that example systems, methods, apparatus, and articles of manufacture have been disclosed that improve the quality and speed of generating labeled images containing text information. In particular, and as described above, the ability for AI/ML systems to analyze captured image data for different purposes depends on such AI/ML systems having properly trained models, which required labeled data that is accurate. Traditional techniques of generating labeled data includes human discretion that can overlook errors in the OCR process that, if not corrected, become erroneous inputs to AI/ML systems. Additionally, such AI/ML systems require relatively large numbers of samples of labeled data. Examples disclosed herein improve both (a) the quality of labeled images to be provided to AI/ML systems and (b) the speed at which accurate labeled images can be generated for use by AI/ML systems.

Example methods, apparatus, systems, and articles of manufacture to label text on images are disclosed herein. Further examples and combinations thereof include the following:

Example 1 includes an apparatus to label text comprising interface circuitry to retrieve images, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate colorizer circuitry to apply color to text boxes corresponding to optical character recognition (OCR) data associated with an image, OCR manager circuitry to render an OCR text prompt associated with the OCR data, the OCR text prompt to be rendered proximate to respective ones of the text boxes, the OCR text prompt to display a text portion of the OCR data, and edit circuitry to render an interface in response to selection of the OCR text prompt, the interface populated with the text portion of the OCR data, and in response to an overwrite input to the interface, update the text portion of the OCR data in a memory corresponding to the image.

Example 2 includes the apparatus as defined in example 1, wherein the processor circuitry is to instantiate the edit circuitry to render an entity panel in response to detecting selection of two or more of the text boxes.

Example 3 includes the apparatus as defined in example 2, wherein the processor circuitry is to instantiate the edit circuitry to associate the two or more selected ones of the text boxes with an entity value.

Example 4 includes the apparatus as defined in example 2, wherein the entity panel includes a plurality of candidate entity values.

Example 5 includes the apparatus as defined in example 1, wherein the processor circuitry is to instantiate linking circuitry to render a group line selector.

Example 6 includes the apparatus as defined in example 5, wherein the processor circuitry is to instantiate the linking circuitry to group ones of the text boxes that intersect the group line selector as associated with a product.

Example 7 includes the apparatus as defined in example 1, wherein the processor circuitry is to instantiate the OCR manager circuitry to invoke OCR services for the image when the image does not include OCR data.

Example 8 includes the apparatus as defined in example 1, wherein the OCR data includes at least one of the text portion, an entity type, or a metadata portion.

Example 9 includes an apparatus to label text, comprising colorizer circuitry to apply color to text boxes corresponding to optical character recognition (OCR) data associated with an image, OCR manager circuitry to render an OCR text prompt associated with the OCR data, the OCR text prompt to be rendered proximate to respective ones of the text boxes, the OCR text prompt to display a text portion of the OCR data, and edit circuitry to render an interface in response to selection of the OCR text prompt, the interface populated with the text portion of the OCR data, and in response to an overwrite input to the interface, update the text portion of the OCR data in a memory corresponding to the image.

Example 10 includes the apparatus as defined in example 9, wherein the edit circuitry is to render an entity panel in response to detecting selection of two or more of the text boxes.

Example 11 includes the apparatus as defined in example 10, wherein the edit circuitry is to associate the two or more selected ones of the text boxes with an entity value.

Example 12 includes the apparatus as defined in example 10, wherein the entity panel includes a plurality of candidate entity values.

Example 13 includes the apparatus as defined in example 9, further including linking circuitry to render a group line selector.

Example 14 includes the apparatus as defined in example 13, wherein the linking circuitry is to group ones of the text boxes that intersect the group line selector as associated with a product.

Example 15 includes the apparatus as defined in example 9, wherein the OCR manager circuitry is to invoke OCR services for the image when the image does not include OCR data.

Example 16 includes the apparatus as defined in example 9, wherein the OCR data includes at least one of the text portion, an entity type, or a metadata portion.

Example 17 includes At least one non-transitory computer readable storage medium comprising instructions that, when executed, cause processor circuitry to at least apply color to text boxes corresponding to optical character recognition (OCR) data associated with an image, render an OCR text prompt associated with the OCR data, the OCR text prompt to be rendered proximate to respective ones of the text boxes, the OCR text prompt to display a text portion of the OCR data, render an interface in response to selection of the OCR text prompt, the interface populated with the text portion of the OCR data, and in response to an overwrite input to the interface, update the text portion of the OCR data in a memory corresponding to the image.

Example 18 includes the at least one non-transitory computer readable storage medium as defined in example 17, wherein the instructions, when executed, cause the processor circuitry to render an entity panel in response to detecting selection of two or more of the text boxes.

Example 19 includes the at least one non-transitory computer readable storage medium as defined in example 18, wherein the instructions, when executed, cause the processor circuitry to associate the two or more selected ones of the text boxes with an entity value.

Example 20 includes the at least one non-transitory computer readable storage medium as defined in example 17, wherein the instructions, when executed, cause the processor circuitry to render a group line selector, and group ones of the text boxes that intersect the group line selector as associated with a product.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to label text comprising:
   interface circuitry to retrieve images;
   machine-readable instructions; and
   at least one processor circuit to be programmed by the machine-readable instructions to:
   generate text boxes indicative of portions of an image containing optical character recognition (OCR) data;
   render an OCR text prompt proximate to respective ones of the text boxes containing the OCR data, the OCR text prompt to display a text portion of the OCR data;
   render an interface in response to selection of the OCR text prompt, the interface populated with the text portion of the OCR data; and
   in response to an overwrite input to the interface, update the text portion of the OCR data in a memory corresponding to the image.

2. The apparatus as defined in claim 1, wherein one or more of the at least one processor circuit is to render an entity panel in response to detecting selection of two or more of the text boxes.

3. The apparatus as defined in claim 2, wherein one or more of the at least one processor circuit is to associate the two or more selected ones of the text boxes with an entity value.

4. The apparatus as defined in claim 2, wherein the entity panel includes a plurality of candidate entity values.

5. The apparatus as defined in claim 1, wherein one or more of the at least one processor circuit is to render a group line selector.

6. The apparatus as defined in claim 5, wherein one or more of the at least one processor circuit is to group ones of the text boxes that intersect the group line selector as associated with a product.

7. The apparatus as defined in claim 1, wherein one or more of the at least one processor circuit is to invoke OCR services for the image when the image does not include OCR data.

8. The apparatus as defined in claim 1, wherein the OCR data includes at least one of the text portion, an entity type, or a metadata portion.

9. An apparatus to label text, comprising:
   colorizer circuitry to generate color text boxes corresponding to portions of an image containing optical character recognition (OCR) data;
   OCR manager circuitry to render an OCR text prompt proximate to respective ones of the text boxes containing the OCR data, the OCR text prompt to display a text portion of the OCR data; and
   edit circuitry to:
   render an interface in response to selection of the OCR text prompt, the interface populated with the text portion of the OCR data; and
   in response to an overwrite input to the interface, update the text portion of the OCR data in a memory corresponding to the image.

10. The apparatus as defined in claim 9, wherein the edit circuitry is to render an entity panel in response to detecting selection of two or more of the text boxes.

11. The apparatus as defined in claim 10, wherein the edit circuitry is to associate the two or more selected ones of the text boxes with an entity value.

12. The apparatus as defined in claim 10, wherein the entity panel includes a plurality of candidate entity values.

13. The apparatus as defined in claim 9, further including linking circuitry to render a group line selector.

14. The apparatus as defined in claim 13, wherein the linking circuitry is to group ones of the text boxes that intersect the group line selector as associated with a product.

15. The apparatus as defined in claim 9, wherein the OCR manager circuitry is to invoke OCR services for the image when the image does not include OCR data.

16. The apparatus as defined in claim 9, wherein the OCR data includes at least one of the text portion, an entity type, or a metadata portion.

17. At least one non-transitory computer readable storage medium comprising machine-readable instructions to cause at least one processor circuit to at least:
   generate text boxes associated with portions of an image containing optical character recognition (OCR) data;
   render an OCR text prompt proximate to respective ones of the text boxes containing the OCR data, the OCR text prompt to display a text portion of the OCR data;
   render an interface in response to selection of the OCR text prompt, the interface populated with the text portion of the OCR data; and in response to an overwrite input to the interface, update the text portion of the OCR data in a memory corresponding to the image.

18. The at least one non-transitory computer readable storage medium as defined in claim 17, wherein the machine-readable instructions are to cause the at least one processor circuit to render an entity panel in response to detecting selection of two or more of the text boxes.

19. The at least one non-transitory computer readable storage medium as defined in claim 18, wherein the machine-readable instructions are to cause the at least one processor circuit to associate the two or more selected ones of the text boxes with an entity value.

20. The at least one non-transitory computer readable storage medium as defined in claim 17, wherein the machine-readable instructions are to cause the at least one processor circuit to:
- render a group line selector; and
- group ones of the text boxes that intersect the group line selector as associated with a product.

\* \* \* \* \*